US008881364B2

(12) United States Patent
Sawdon et al.

(10) Patent No.: US 8,881,364 B2
(45) Date of Patent: Nov. 11, 2014

(54) PIERCE NUT INSERTION TOOL

(75) Inventors: Edwin G. Sawdon, St. Clair, MI (US); Stephen E. Sawdon, Marysville, MI (US); Steven J. Sprotberry, Marysville, MI (US); Brian D. Petit, Algonac, MI (US)

(73) Assignee: BTM Corporation, Marysville, MI (US)

( * ) Notice: Subject to any disclaimer, the term of this patent is extended or adjusted under 35 U.S.C. 154(b) by 285 days.

(21) Appl. No.: 13/308,583

(22) Filed: Dec. 1, 2011

(65) Prior Publication Data

US 2012/0137496 A1 Jun. 7, 2012

Related U.S. Application Data

(60) Provisional application No. 61/419,376, filed on Dec. 3, 2010.

(51) Int. Cl.
*B23P 19/06* (2006.01)
*F16B 37/06* (2006.01)

(52) U.S. Cl.
CPC ............ *B23P 19/062* (2013.01); *F16B 37/062* (2013.01)
USPC ........... 29/432.1; 29/243.56; 29/798; 29/809; 29/816

(58) Field of Classification Search
CPC ................................................... B23P 19/062
USPC ............. 29/432.1, 432.2, 524.1, 525.06, 798, 29/809, 816, 818, 243.5, 243.55, 243.56, 29/255, 252
See application file for complete search history.

(56) References Cited

U.S. PATENT DOCUMENTS

| 3,108,368 | A | 10/1963 | Steward |
| 3,766,628 | A | 10/1973 | Grube |
| 3,942,235 | A | 3/1976 | Goodsmith et al. |
| 3,946,479 | A | 3/1976 | Goodsmith et al. |
| 4,164,072 | A | 8/1979 | Shinjo |
| 4,242,793 | A | 1/1981 | Matthews et al. |
| 4,313,261 | A | 2/1982 | Ladouceur |
| 4,348,796 | A | 9/1982 | Smallegan |
| 4,384,667 | A | 5/1983 | Smallegan et al. |
| 4,555,838 | A | 12/1985 | Muller |

(Continued)

FOREIGN PATENT DOCUMENTS

| EP | 0580907 A1 | 2/1994 |
| GB | 1373633 | 11/1974 |

OTHER PUBLICATIONS

Humphrey® (HKV-7), "Valve Catalog," Humphrey Products Company, Kalamazoo, MI USA—www.humphrey-products.com (published at least as early as Nov. 28, 2011); 99pp.

(Continued)

*Primary Examiner* — David Bryant
*Assistant Examiner* — Steven A Maynard
(74) *Attorney, Agent, or Firm* — Harness, Dickey & Pierce, P.L.C.

(57) ABSTRACT

A pierce nut insertion tool is provided. In another aspect, a pierce nut feeding mechanism has a mechanically independent driver actuator from that of a punch. A further aspect of the present tool employs a member, moveable with a punch, that retains a pierce nut prior to fastening of the nut to a workpiece. An additional aspect uses a fluid actuated nut feeder including a piston.

26 Claims, 18 Drawing Sheets

(56) References Cited

U.S. PATENT DOCUMENTS

| | | | | |
|---|---|---|---|---|
| 4,574,453 | A | 3/1986 | Sawdon | |
| 4,670,978 | A | 6/1987 | Fickes et al. | |
| 4,700,470 | A | 10/1987 | Muller | |
| 4,722,647 | A | 2/1988 | Sawdon | |
| 4,785,529 | A | 11/1988 | Pamer et al. | |
| 5,161,303 | A | 11/1992 | Maynard et al. | |
| 5,172,467 | A | 12/1992 | Muller | |
| 5,181,315 | A | 1/1993 | Goodsmith | |
| 5,339,983 | A | 8/1994 | Caple | |
| 5,487,215 | A | 1/1996 | Ladouceur | |
| 5,502,884 | A | 4/1996 | Ladouceur | |
| 5,502,888 | A * | 4/1996 | Takahashi et al. | 29/798 |
| 5,522,129 | A | 6/1996 | Shinjo | |
| 5,533,250 | A | 7/1996 | Ladouceur | |
| 5,560,094 | A | 10/1996 | Ladouceur et al. | |
| 5,657,536 | A | 8/1997 | Shinjo | |
| 5,713,116 | A | 2/1998 | Nickerson et al. | |
| 5,722,139 | A | 3/1998 | Ladouceur et al. | |
| 5,953,813 | A | 9/1999 | Sickels et al. | |
| 6,018,863 | A | 2/2000 | Altrock | |
| 6,021,562 | A | 2/2000 | Boster et al. | |
| 6,226,854 | B1 | 5/2001 | Ladouceur et al. | |
| 6,257,814 | B1 | 7/2001 | Muller | |
| 6,263,561 | B1 | 7/2001 | Sickels et al. | |
| 6,357,109 | B1 | 3/2002 | Shinjo | |
| 6,442,830 | B1 | 9/2002 | Vrana | |
| 6,526,650 | B2 | 3/2003 | Gaskin | |
| 6,560,846 | B1 | 5/2003 | Shioya et al. | |
| 6,578,258 | B1 | 6/2003 | Boyer et al. | |
| 6,631,827 | B2 | 10/2003 | Goodsmith et al. | |
| 6,820,327 | B2 | 11/2004 | Vrana | |
| 6,832,431 | B2 | 12/2004 | Bloch et al. | |
| 6,893,198 | B2 | 5/2005 | Couillais et al. | |
| 6,925,698 | B2 * | 8/2005 | Goodsmith et al. | 29/432.1 |
| 6,954,976 | B2 * | 10/2005 | Ladouceur et al. | 29/432.2 |
| 6,957,483 | B2 * | 10/2005 | Woods | 29/798 |
| 6,993,831 | B2 | 2/2006 | Vrana | |
| 6,997,659 | B2 | 2/2006 | Vrana et al. | |
| 7,032,296 | B2 | 4/2006 | Zdravkovic et al. | |
| 7,152,297 | B2 | 12/2006 | Ladouceur et al. | |
| 7,237,996 | B2 | 7/2007 | Vrana | |
| 7,260,893 | B2 | 8/2007 | Calhoun et al. | |
| 7,338,245 | B2 | 3/2008 | Ladouceur | |
| 7,367,893 | B2 | 5/2008 | Vrana et al. | |
| 7,427,180 | B2 | 9/2008 | Ladoucer et al. | |
| 7,475,473 | B2 * | 1/2009 | Lang et al. | 29/798 |
| 2004/0123708 | A1 | 7/2004 | Savoy et al. | |
| 2007/0274804 | A1 | 11/2007 | Woods | |
| 2008/0201934 | A1 | 8/2008 | Ward et al. | |

OTHER PUBLICATIONS

Screen shots of: "Arnold Shinjo Fastening Systems," YouTube website video (3m:27s) observed at http://www.youtube.com/watch?v=GWr4yxRLr7c (published prior to Dec. 3, 2010); 2pp.

Screen shots of: "Haeger M8 nut installation," YouTube website video (0m:39s) observed at http://www.youtube.com/watch?v=iw0ioWa6LOw (published prior to Dec. 3, 2010); 3pp.

\* cited by examiner

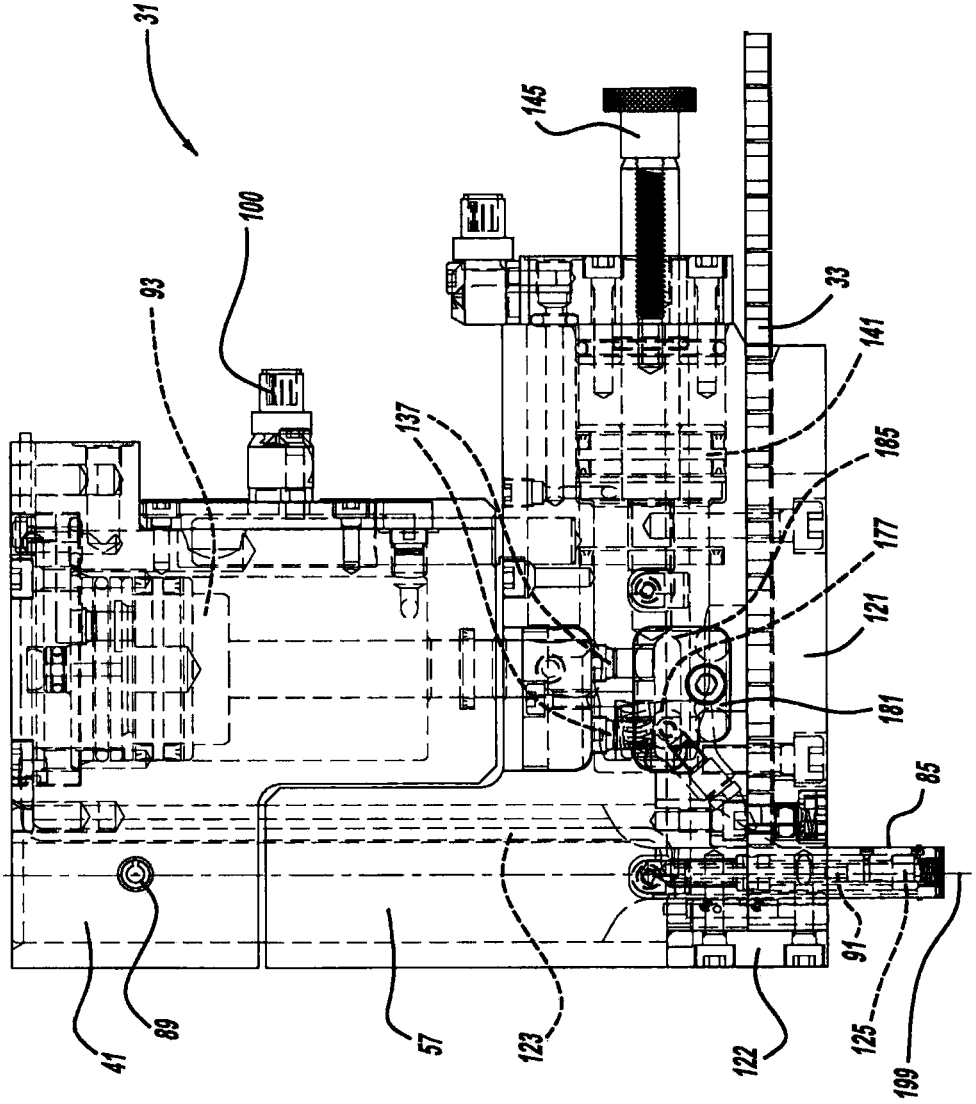

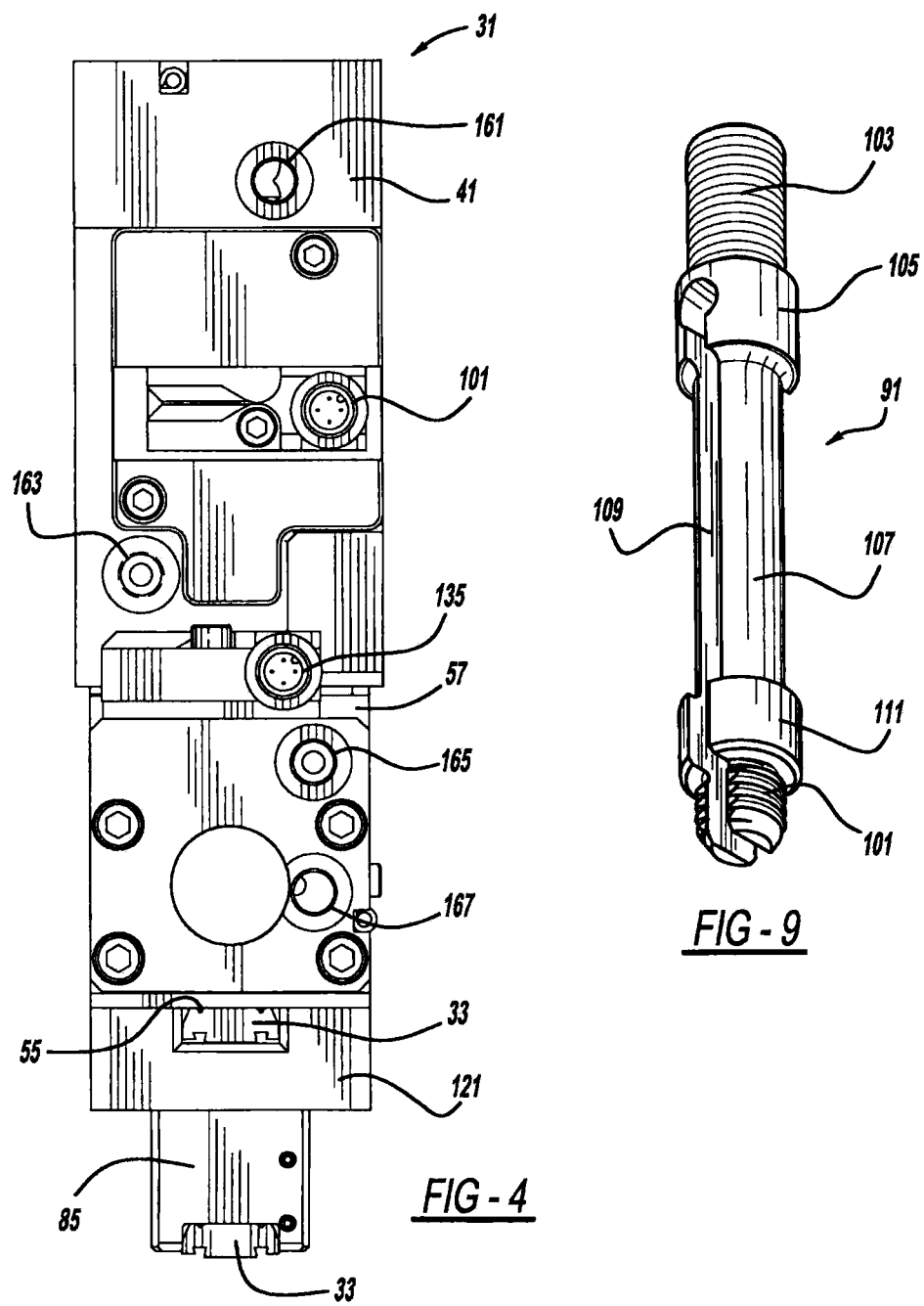

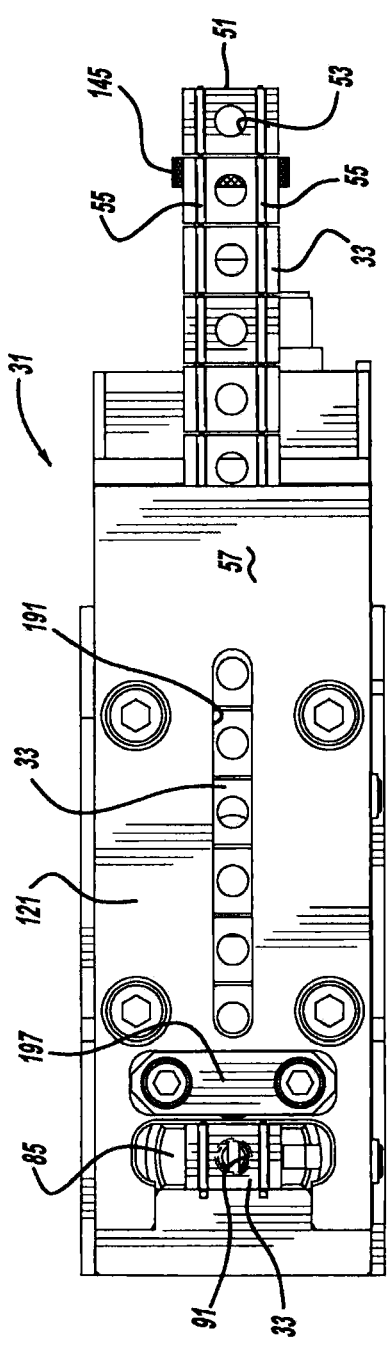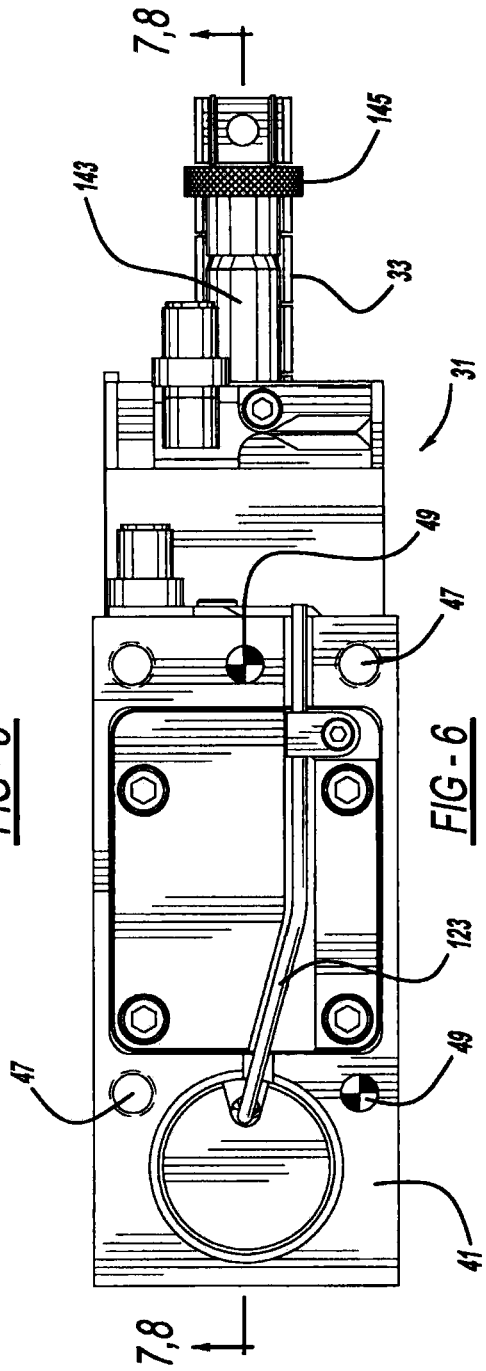

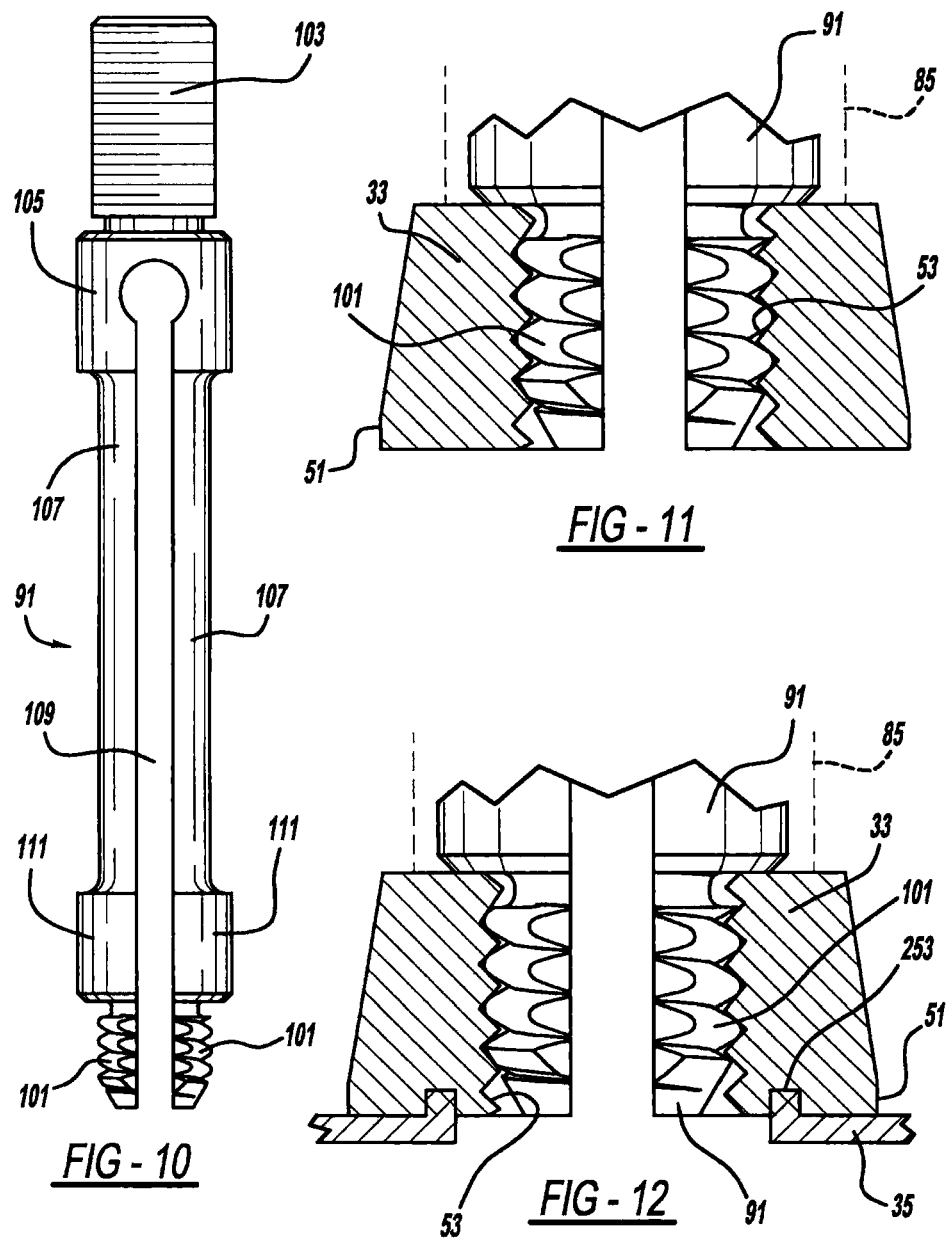

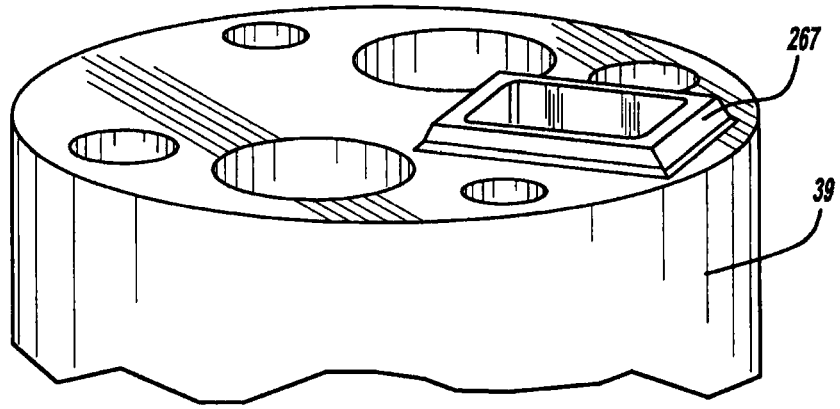
FIG-20
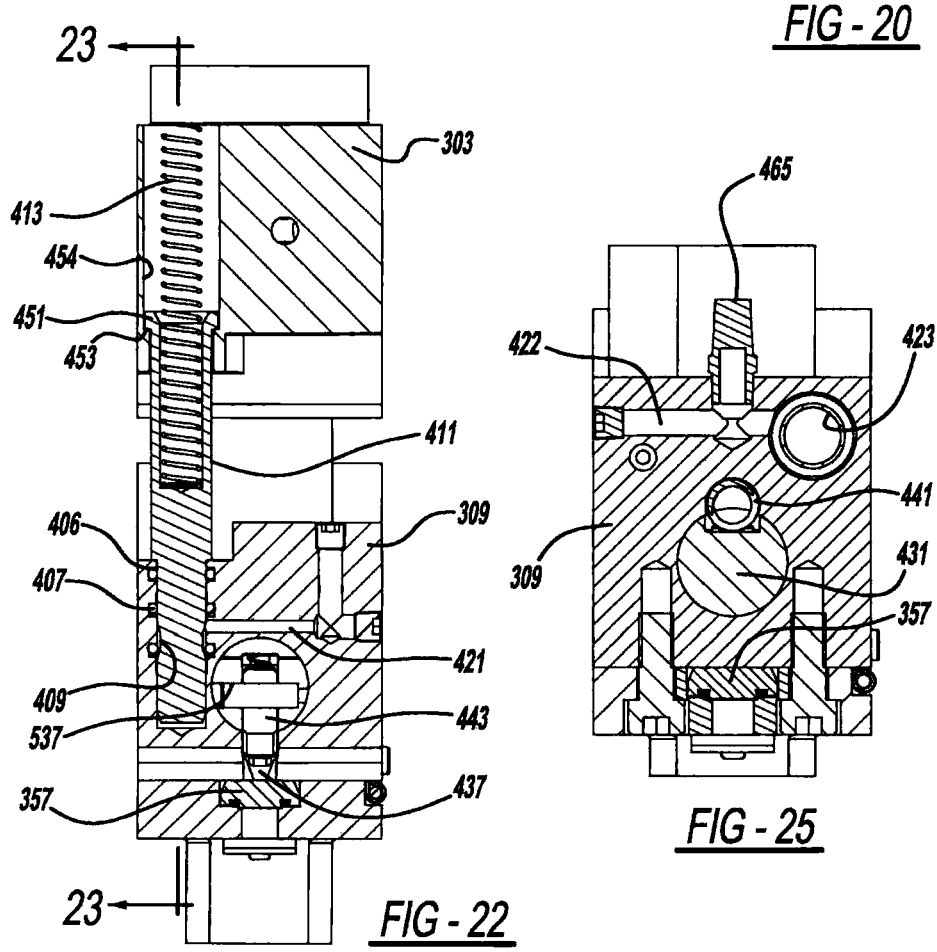
FIG-22
FIG-25

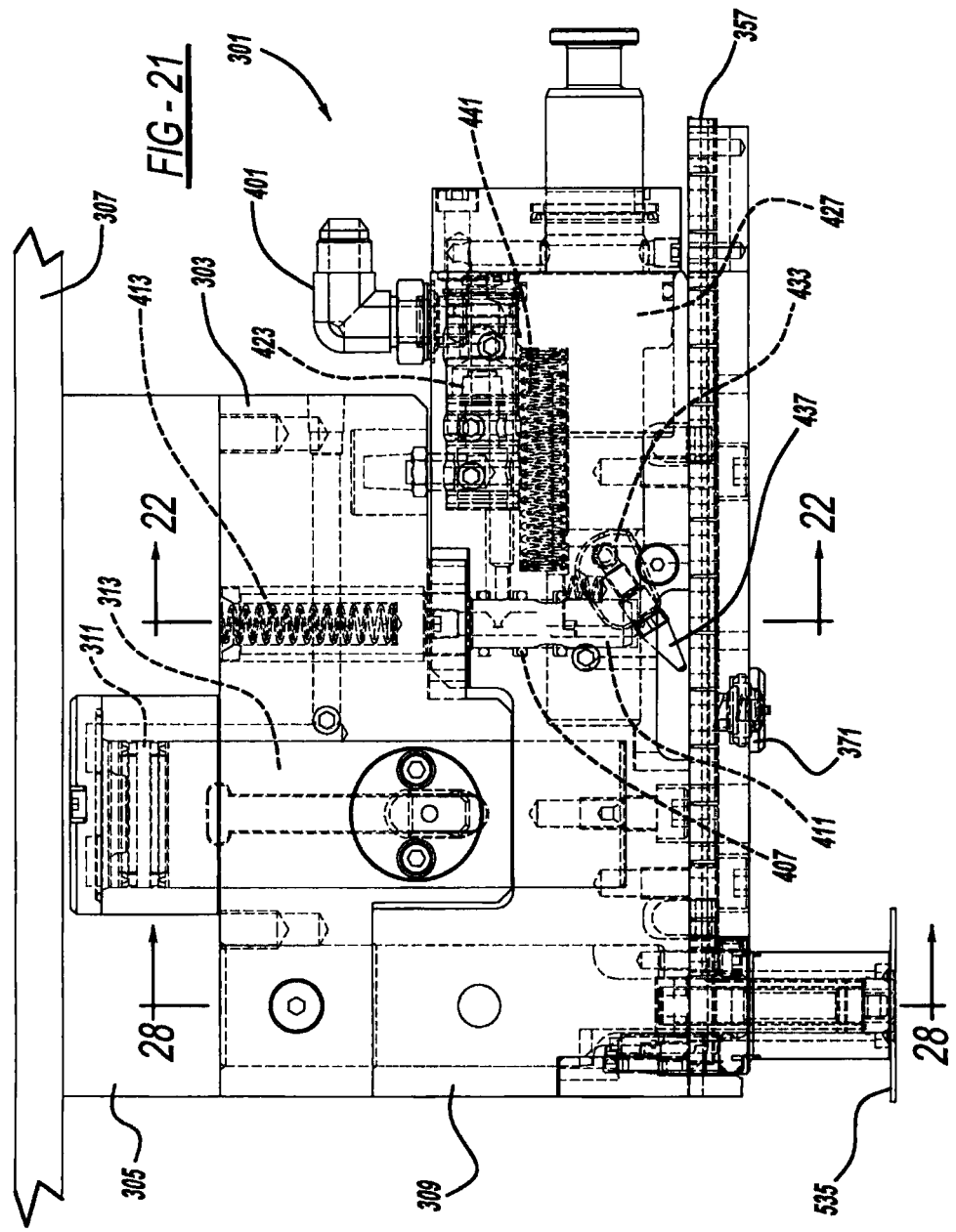

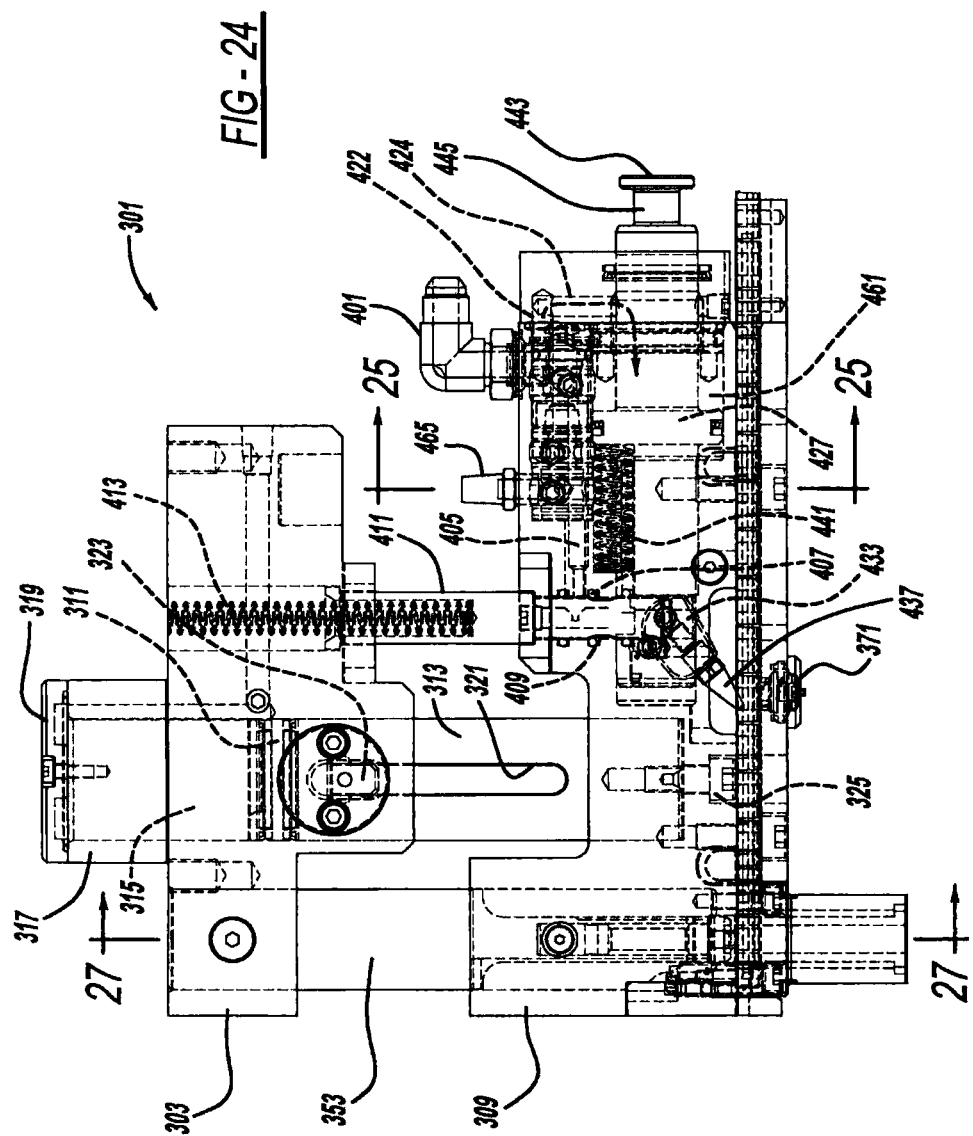

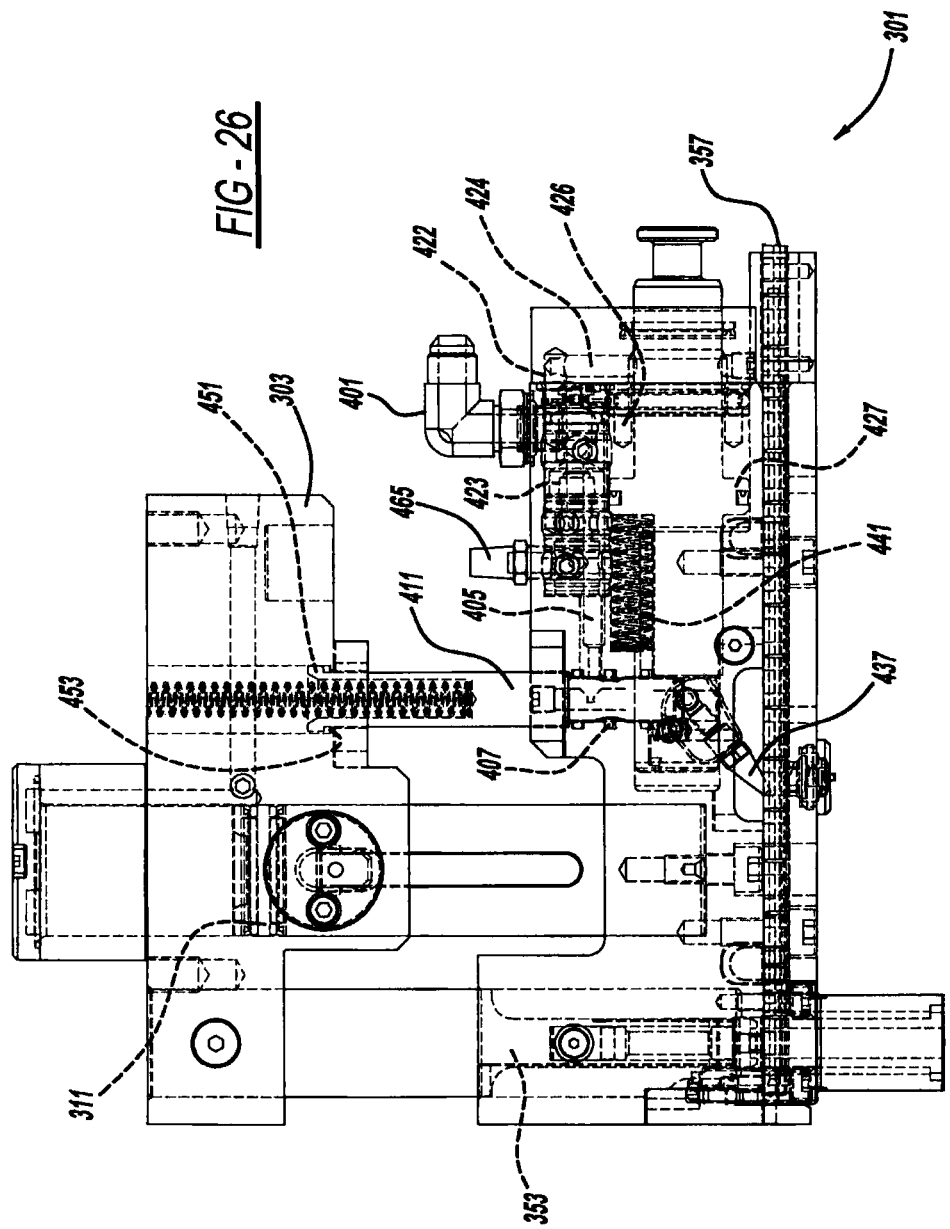

PIERCE NUT INSERTION TOOL

CROSS-REFERENCE TO RELATED APPLICATION

The present application claims priority to U.S. Provisional Patent Application Ser. No. 61/419,376, filed on Dec. 3, 2010, which is incorporated by reference herein.

BACKGROUND AND SUMMARY

The present invention generally pertains to fastening machines and more particularly to a pierce nut insertion tool.

It is well known to install pierce nuts in sheet metal panels. Exemplary installation machines are disclosed in the following U.S. Pat. No. 3,108,368 entitled "Method of Sizing and Installing a Pierce Nut in a Panel" which issued to Steward on Oct. 29, 1963; U.S. Pat. No. 6,257,814 entitled "Self-Attaching Fastener, Method of Forming Same and Method of Attachment" which issued to Müller on Jul. 10, 2001; U.S. Pat. No. 6,925,698 entitled "Method of Feeding and Installing Self-Attaching Nuts" which issued to Goodsmith et al. on Aug. 9, 2005; and U.S. Pat. No. 6,957,483 entitled "Self-Diagnosing Pierce Nut Installation Apparatus" which issued to Woods on Oct. 25, 2005. All of these patents are incorporated by reference herein. Various of these conventional machines, however, require complex cam-rotated fingers or spring loaded ball bearings biased to engage a separated nut aligned with a ram prior to ram extension; these complex moving parts are subject to wear and damage, are difficult to service, and are of heightened concern since they also contact against the high force ram. Furthermore, these conventional machines do not allow for independent control and timing of a nut feeding mechanism. Moreover, it can be a challenge to strip the nut from connective wires, and then orient and center the pierce nut relative to the die throughout the ram and nut travel.

U.S. Pat. No. 5,172,467 entitled "Installation Apparatus for Installing Self-Attaching Fasteners" which issued to Muller on Dec. 22, 1992, discloses a pneumatically driven piston for shuttling a single stud. This patent is incorporated by reference herein. This apparatus, however, is overly simplistic and can only push a single stud from an intermediate supply tube per stroke, thereby incurring long cycle times and misfeed concerns. The piston is externally mounted and requires expensive external valve control and connections by the user.

In accordance with the present invention, a pierce nut installation tool is provided. In another aspect, a pierce nut feeding mechanism has a mechanically independent driver or actuator from that of a punch. Yet another aspect provides a fluid actuated pierce nut feeder, more preferably with an internal valve and/or control arrangement to advantageously reduce installation complexity and increase cycle speed. A further aspect of the present tool employs a member, attached to a punch, that retains a pierce nut prior to fastening of the nut to a workpiece. A serviceable pierce nut feeding mechanism is provided in yet another aspect of the present tool.

The present tool is advantageous over conventional machines. For example, the independent actuator for the present pierce nut feeding mechanism allows the operator to change settings on a programmable controller in order to vary a stroke length or end distances, and also to vary the timing of the feed mechanism relative to a punch actuator. This can additionally be varied between different types of pierce nuts and workpiece configurations. In the internally valved and/or controlled configuration, external customer installation complexity is reduced while still allowing for the force and cycle speed benefits of fluid actuation; expensive sensors for the piston location are also not required with this approach. The present tool advantageously accurately centers and orients the pierce nut relative to the punch and die with minimal tool components. A manual feeding mechanism for the pierce nut is also employed in addition to an automatically powered actuator. Furthermore, the low profile body and nut feeding mechanism of the present tool is advantageously configured to place the pierce nut closer to edges and flanges of workpieces than many traditional machines. The present tool provides more space between a bottom of a punch-side tool and the workpiece. Additional advantages and features of the present invention will be found in the following description and accompanying claims, as well as in the appended drawings.

BRIEF DESCRIPTION OF THE DRAWINGS

FIG. 3 is a side elevation view showing the punch-side of the insertion tool;

FIG. 4 is an end elevation view showing the punch-side of the insertion tool;

FIG. 5 is a bottom elevation view showing the punch-side of the insertion tool;

FIG. 6 is a top elevation view showing the punch-side of the insertion tool;

FIG. 9 is a perspective view showing a plunger employed in the insertion tool;

FIG. 10 is a side elevation view showing the plunger employed in the insertion tool;

FIG. 11 is an enlarged and fragmentary side view showing the plunger engaging a pierce nut, of the insertion tool;

FIG. 12 is similar to FIG. 11, but viewed 90° therefrom;

FIG. 20 is a fragmentary, perspective view showing a third embodiment of the die-side of the insertion tool;

FIG. 21 is a side elevational view showing a preferred embodiment of a punch-side of a pierce nut insertion tool, in a closed and nut fastening position;

FIG. 22 is a cross-sectional view, taken along line 22-22 of FIG. 21, showing the preferred embodiment insertion tool, in a fully open position;

FIG. 24 is a side elevational view showing the preferred embodiment insertion tool, in the fully open position;

FIG. 25 is a cross-sectional view, taken along line 25-25 of FIG. 24, showing the preferred embodiment insertion tool;

FIG. 26 is a side elevational view showing the preferred embodiment insertion tool, in the intermediate position;

DETAILED DESCRIPTION

Figure 1:
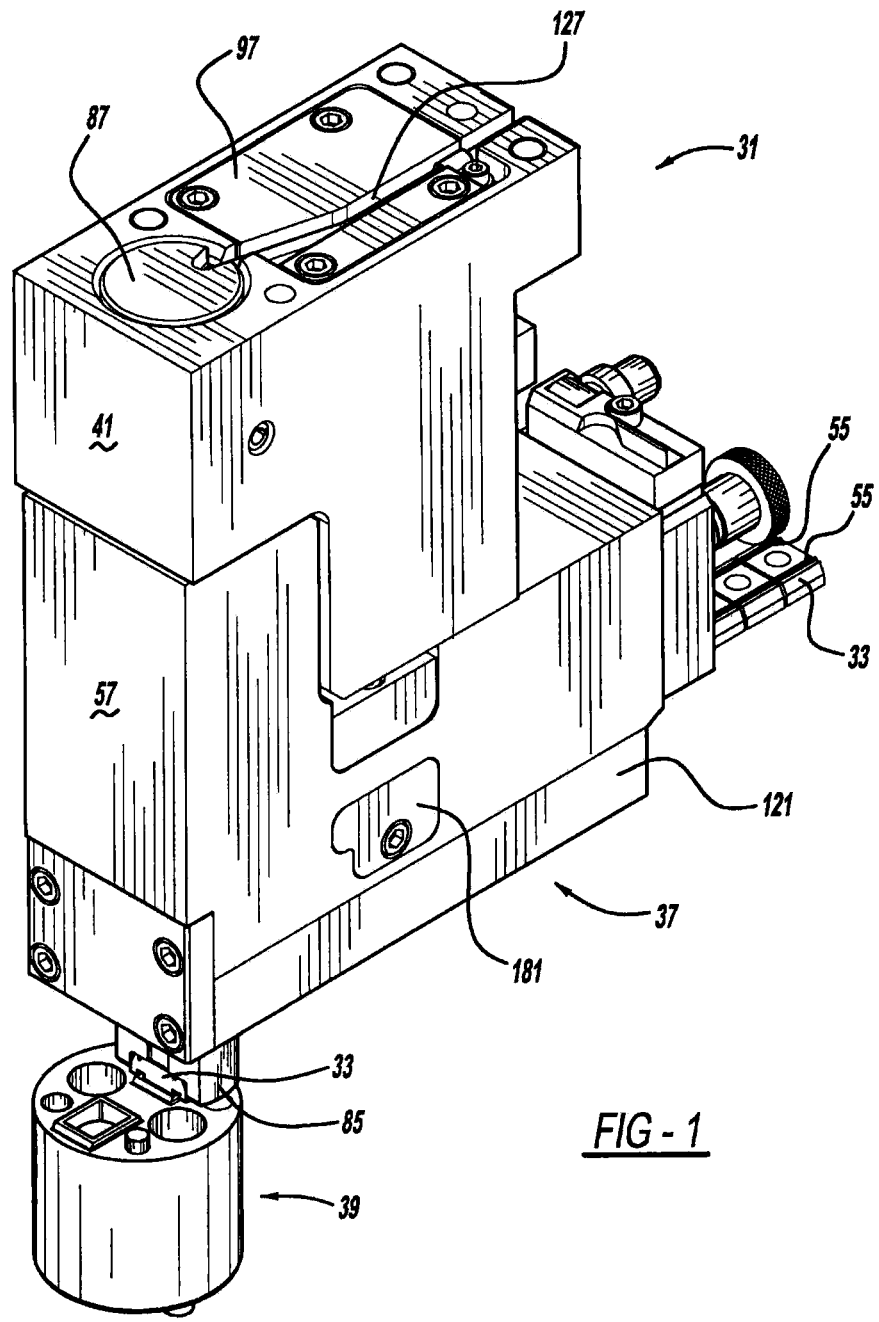
FIG. 1 is a perspective view showing a pierce nut insertion tool.

An alternate embodiment of a pierce nut insertion tool 31 is illustrated in FIG. 1-7. Tool 31 is used to clinch pierce nuts 33 to a sheet metal panel or workpiece 35. Tool 31 includes a punch-side assembly 37 and a die 39, between which are loaded workpieces 35. A generally T-shaped base 41 is secured to a moveable platten 43 of a press and die 39 is secured to a fixed platten 45 of the press, both by way of screws 47 and dowels 49. Multiples of tool 31 may be employed in the same press to install multiple pierce nuts in a simultaneous manner.

Pierce nuts 33 each have a generally rectangular top view periphery 51 and an internally threaded central hole 53. A set of pierce nuts 33 are held together in a linear string by a pair of frangible wires 55 secured within corresponding upper grooves in each pierce nut. Pierce nuts 33 are fed into a generally L-shaped rack or body 57 which is longitudinally moveable relative to base 41.

Figure 2:
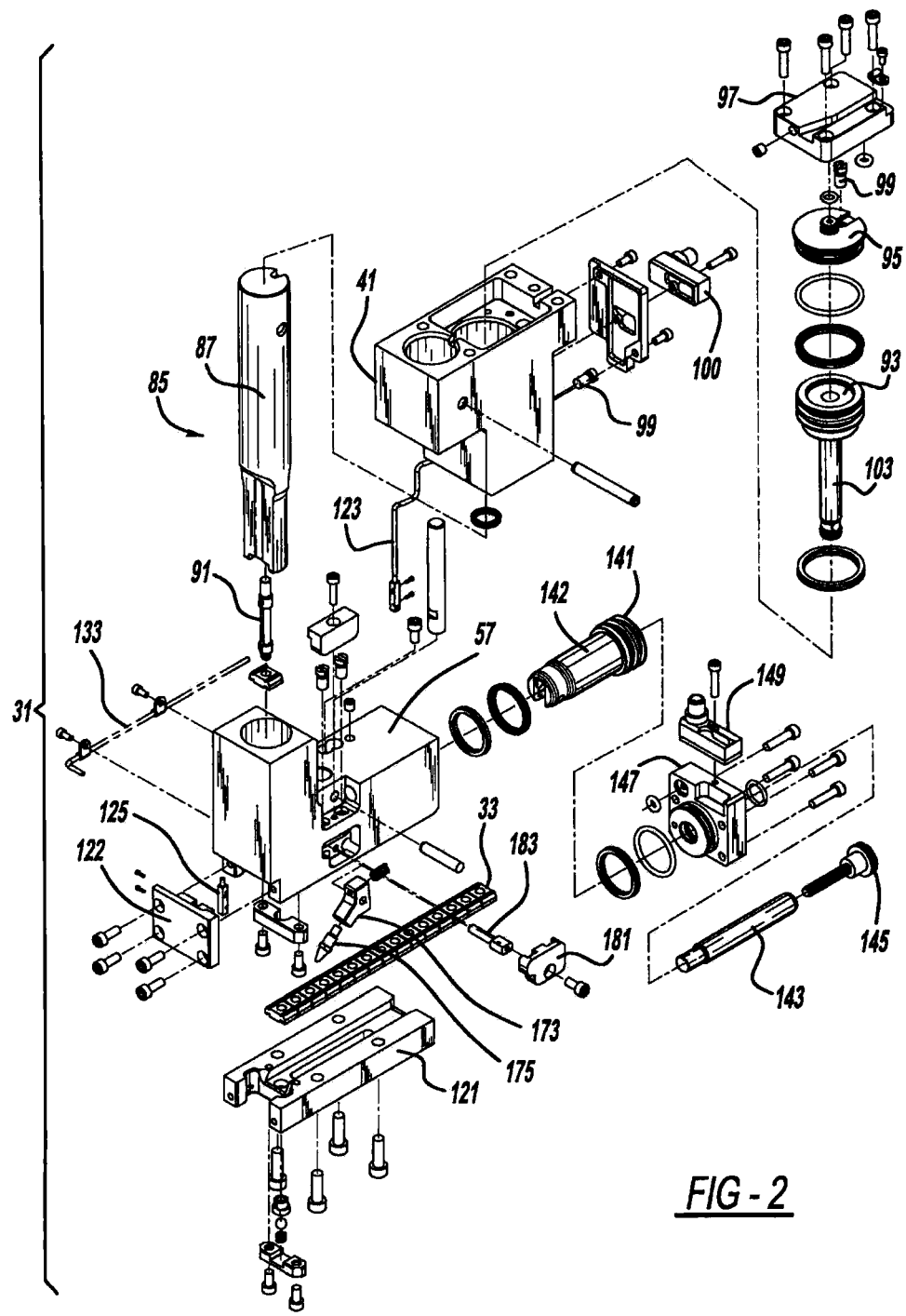
FIG. 2 is an exploded perspective view showing a punch-side of the insertion tool.
Figure 7:
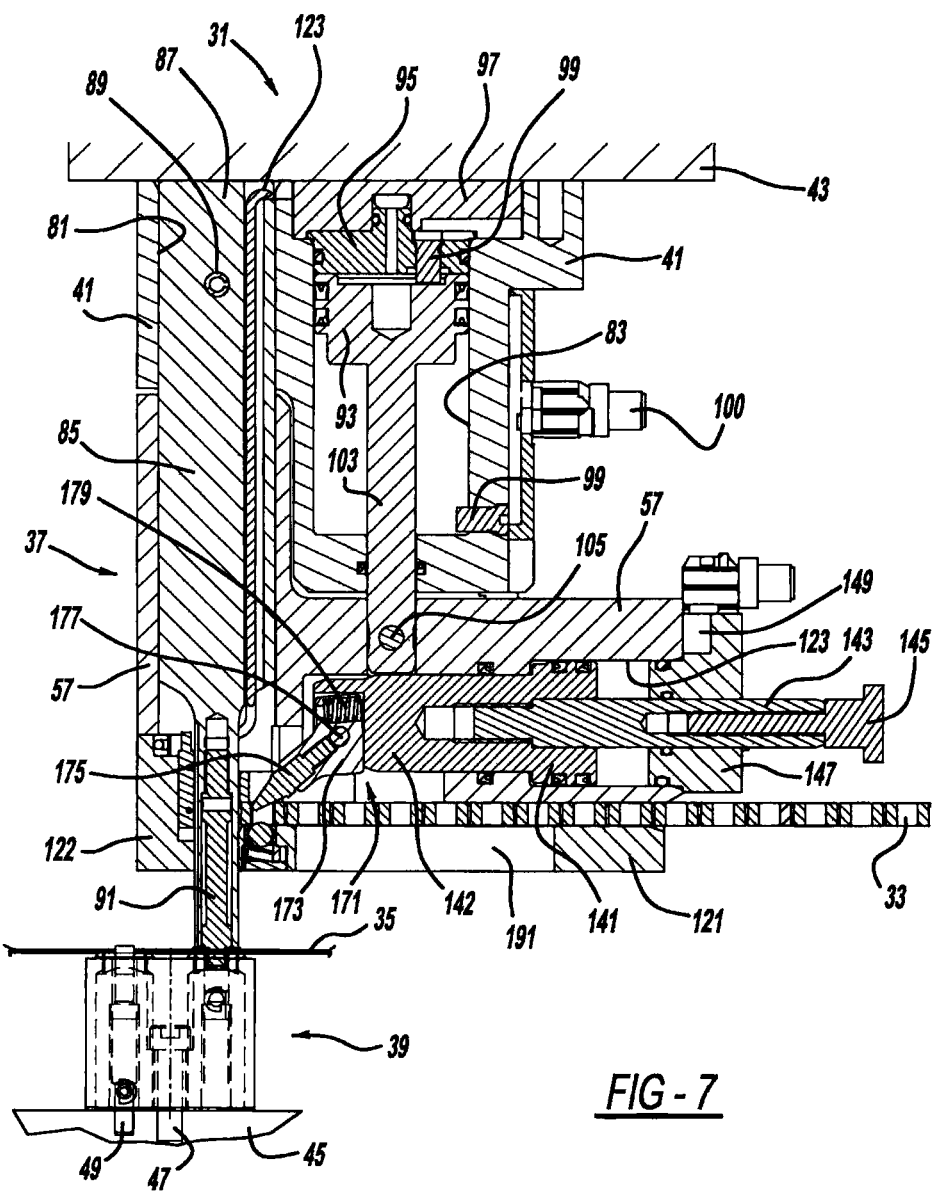
FIGS. 7 and 8 are cross-sectional views of the insertion tool.

Referring to FIGS. 2 and 7, base 41 includes a longitudinally elongated bore 81 and a piston chamber 83. A punch assembly 85 is located in bore 81. Punch assembly 85 includes a longitudinally elongated punch 87, fixed to base 41 by a roll pin 89, and a plunger 91, threadably secured within a hollow shaft of the punch. Furthermore, an automatically driven piston actuator 93 is moveably located within chamber 83. U-cup seals surround piston, and an end cap 95 and end plate 97 are secured to base 41 over the piston chamber. A pair of proximity sensors 99 are also positioned in piston chamber 83 to sense end of stroke positioning of piston 93; a connector and switch pack 100 provides electrical signal access to sensors 99. A piston rod 103 extends from piston 93. A pin 105 connects an end of rod 103 to a central section of body 57.

Body 57 includes a guide block 121 and a nose plate 122. Guide block 121 has a laterally elongated track or depressed channel within which pierce nuts 33 are fed. Guide block 121 is screwed to a bottom (as viewed in FIG. 7) of the body. Body 57 further has a piston chamber 123. An automatically actuated piston 141 is laterally moveable within chamber 123. A structure 143 extends from piston 141. Pistons 141 and 93 are preferably pneumatically operated. An extension arm and knob 145 externally project from an end of piston 141 to allow manual movement of the piston when it is deenergized. This allows for manual feeding of the pierce nuts during initial loading of a new string of nuts or for servicing of the tool. Piston seals, an end cap 147 and a proximity sensor 149 are also provided. Pistons 95 and 141 are mechanically independent from each other so that they can be actuated at different times depending on the type of nut being fed, sheet metal workpiece characteristics, and the like. A pneumatic port 161 (see FIG. 4) causes piston 93 to advance and a port 163 causes piston 93 to retract. Similarly, a port 165 causes piston 141 to retract and a port 167 causes piston to advance, when pneumatic fluid flows therein as dictated by a programmable controller controlling pneumatic valves.

Pierce nut feeding is carried out by a feeder 171 which includes a knuckle 173, a pawl 175 and piston 141. Knuckle 173 rotates about a pivot pin 177 coupled to an end of a structure 142 opposite piston 141. A compression spring 179 biases the adjacent section of knuckle 173 away from structure 142. Pawl 175 includes a generally conical end with a rounded tip, and a threaded opposite end. The threaded end of pawl 175 is received within an internally threaded socket of knuckle 173. Thus, pawl 175 can be removed from knuckle 173 and replaced when worn during normal use and maintenance. An access plate 181 is removeably attached to a side surface of body 57 to allow service access to pawl 175. Pivot pin 177 is attached to holes in a bifurcated end of structure 142 associated with piston 141, and a head of pin 177 rides within an elongated slot 185 (see FIGS. 2 and 3) in body 57 to deter piston rotation. Pin 177 is also accessible behind access plate 181.

Figure 8:
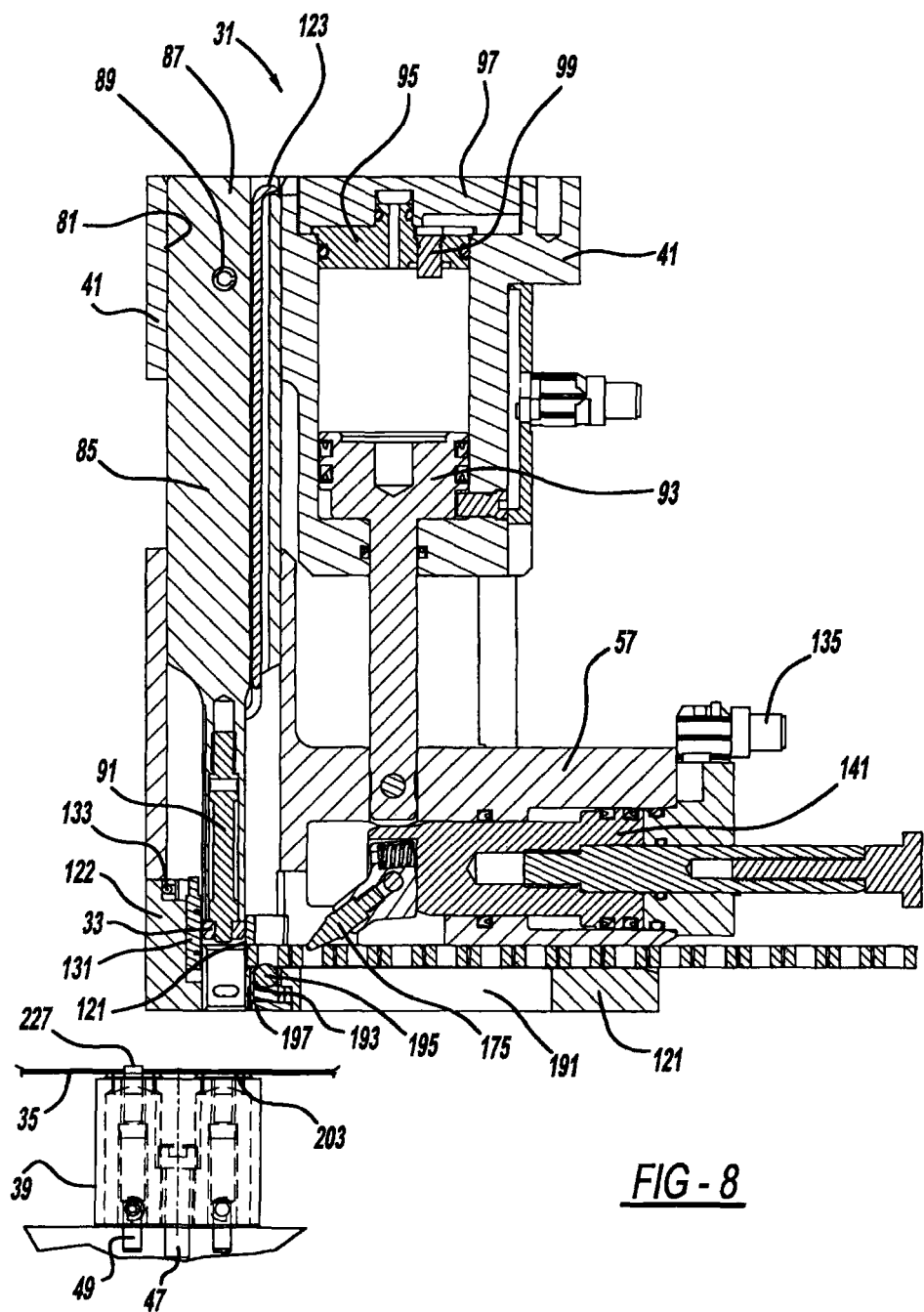
Figure 13:
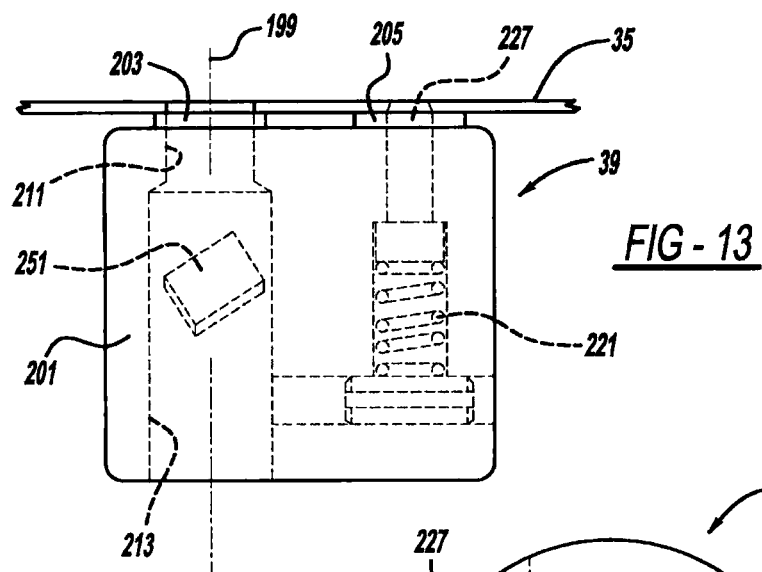
FIG. 13 is a side elevation view showing a die-side of the insertion tool.
Figure 14:
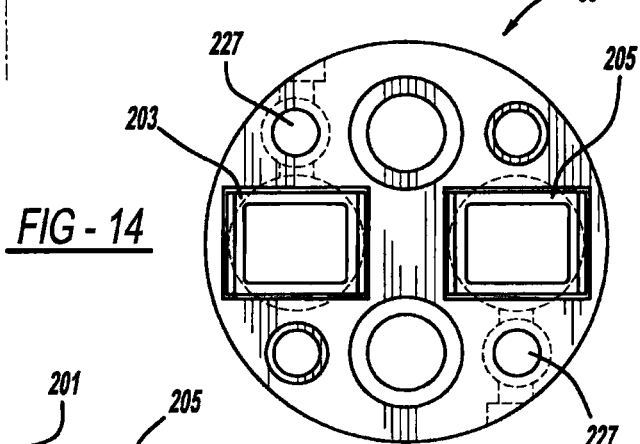
FIG. 14 is a top and true elevation view showing the die-side of the insertion tool.
Figure 15:
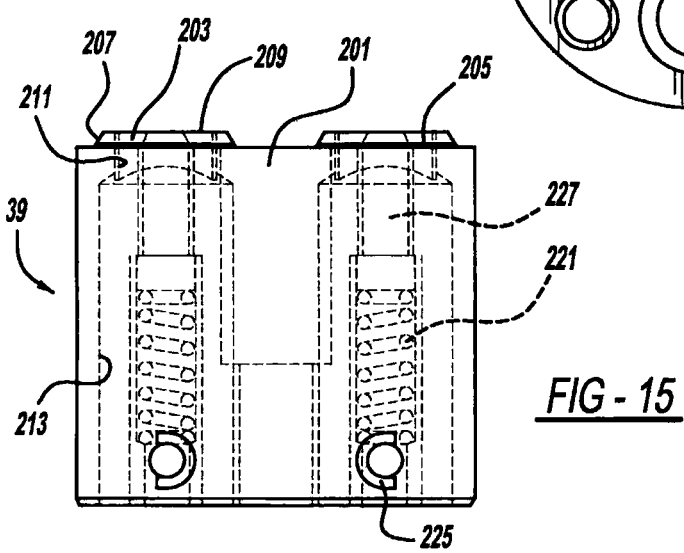
FIG. 15 is similar to FIG. 13; but viewed 90° therefrom.
Figure 16:
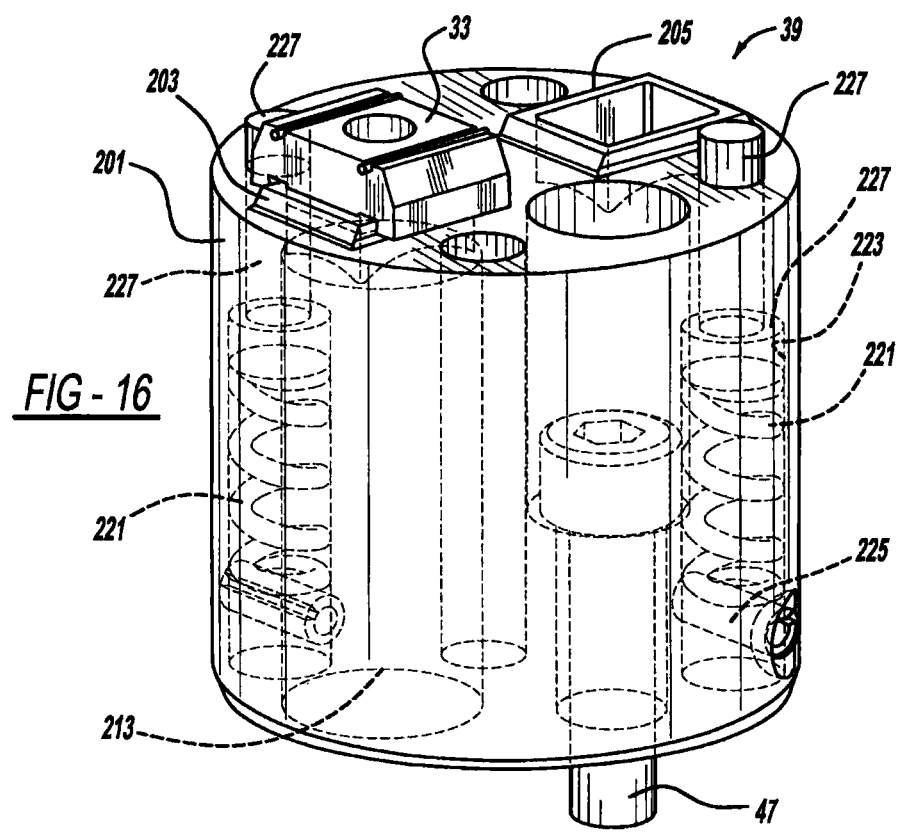
FIG. 16 is a perspective view showing the pierce nut positioned relative to the die-side of the insertion tool.
Figure 17:
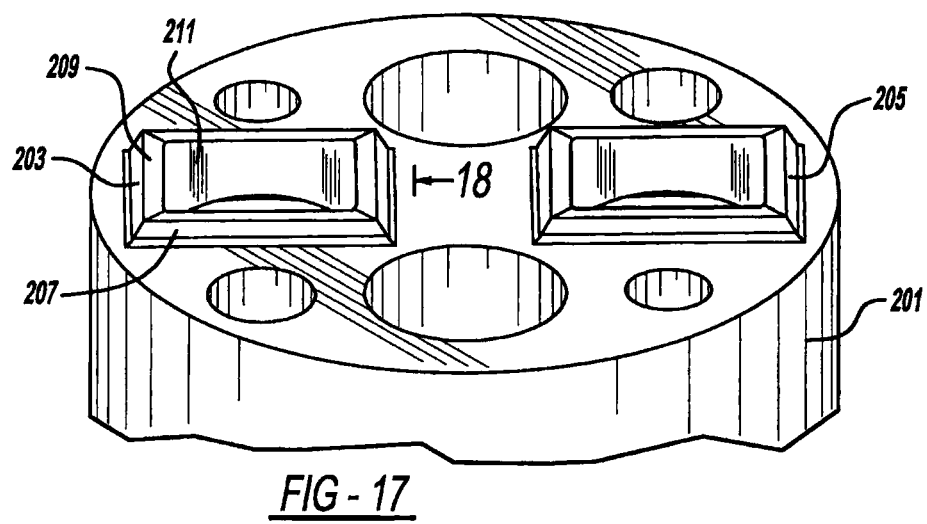
FIG. 17 is a fragmentary, perspective view showing the die-side of the insertion tool.
Figure 18:
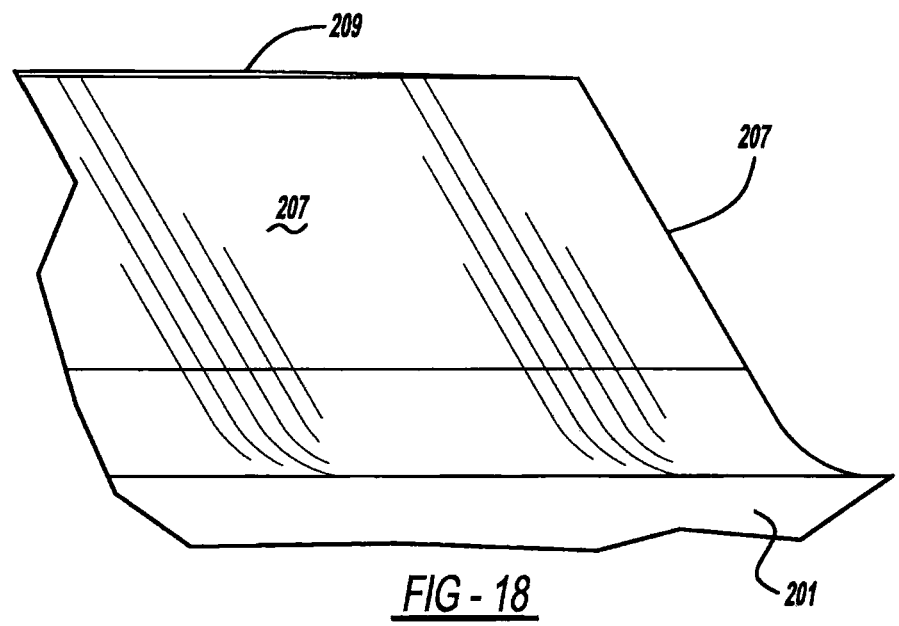
FIG. 18 is an enlarged and fragmentary side elevation view, in the direction of arrow 18 in FIG. 17, showing a tapered edge of the die-side of the insertion tool.

Referring to FIGS. 5, 7 and 8, an elongated access slot 191 is located in a bottom of body 121. This provides visual and hand-tool (e.g., a screwdriver) access to the string of pierce nuts 33 within body 121. This allows for manual feeding or removal of pierce nuts 33 when being initially inserted into the tool or for being removed during tool servicing. Moreover, a compression spring 193, ball bearing 195 and retaining bushing are provided within a bore in body 121; the ball bearing temporarily engages the center hole of each pierce nut 33 in a detent-like manner prior to severing of the nut from the string. A retention plate 197 is screwed to body 121 to create an abutting service for spring 193 opposite ball bearing 195.

Feeder 171 acts as follows. Piston 141 is advanced from the position of FIG. 8 to that of FIG. 7 in a lateral direction transverse to a longitudinal insertion axis 199 (see FIG. 3) which is coaxial with punch assembly 85. Simultaneous with this motion, spring 179 rotates knuckle 173 which causes the conical end of pawl 175 to enter the center hole of a nut 33 and then pushes the string of attached nuts forward toward axis 199.

The nut feeding is performed while piston 93 is advanced and spaces body 57 substantially away from base 41 as is shown in FIG. 8. Thereafter, piston 93 is reverse actuated so as to retract body 57 toward base 41 (similar to the position of FIG. 7 but before the press advances the tool toward the die). This body movement causes a leading pierce nut 33 to engage around externally threaded or patterned, distal end or feet 101 of plunger 91 as is shown in FIGS. 9 through 12. Plunger 91 is a unitary and generally cylindrical member having a threaded proximal end 103, a waist segment 105 and a pair of bifurcated and spaced apart legs 107 separated by a longitudinally elongated slot 109. It has a collet-like configuration. Furthermore, a pair of laterally enlarged abutment ankles 111 serve to abut against and push pierce nut 33 when installed thereon. Externally threaded or patterned feet 101 extend from ankles 111 and have peaks and valleys thereon with a lead-in taper of about 60° from one side to the other. The peaks are generally rounded to allow the feet 101 to be longitudinally and linearly pushed into pierce nut 33 by lateral flexing of legs 107 toward each other so that the peaks temporarily but firmly engage within the internal threads of pierce nut 33. The periphery 51 of pierce nut is also held within bifurcated leading end of punch assembly 85 as can best be viewed in FIGS. 1, 4, and 5. This prevents rotation of the nut during workpiece insertion.

Frangible wires 55 securing the leading pierce nut 33 to the remainder of the pierce nut string are severed when piston 93 thereafter retracts body 57 toward base 41 and the leading pierce nut 33 is correspondingly withdrawn adjacent a wire cutting edge 121 of guide block 121. The leading pierce nut is then ready for insertion into the workpiece as will be later discussed. Therefore, it should be apparent from the above discussion as to the present advantageous construction and ability to feed and retain the pierce nuts onto the punch assembly without the complexity of internal components as used in traditional machines.

It also noteworthy that an internally protected channel is provided for a wire 123 as is shown in FIGS. 6-8. One end of this wire is connected to a sensor 125 (see FIGS. 2 and 3) which is fastened to an outside of punch 85 immediately adjacent its distal end which senses if a nut is retained by plunger 91 after the nut is severed from the nut string. Wire 123 fits within an internal passage of punch 85 and also within an upper channel 127 of base 41. An opposite end of wire 123 is connected to a control panel/PLC. Additionally, a nut present sensor 131 (see FIG. 8) is attached to nose plate 122 for sensing if the leading pierce nut 33 has advanced into a position aligned with axis 199 prior to engagement with plunger 91. A wire 133 extends from sensor 131 to the control panel/PLC. Additionally, proximity sensors 137, used to sense the stroke or travel positioning of feeder piston 141 (see FIG. 3) are connected to a switch pack and connector 135.

An alternate die is shown in FIGS. 1, 7 and 13-18. Die 39 includes a stationary body 201 having a substantially cylindrical peripheral surface and generally flat top and bottom surfaces (as viewed in the Figures). Primary and secondary clinching formations 203 and 205, respectively, project in a generally rectangular shape from the top surface of die body 201 in the present embodiment. The clinching formations each have tapered side walls 207 and a flat edge or surface 209 at its top when viewed in cross-section; alternately, the edge has a bevel oriented to form a higher cutting line adjacent an interior of edge 209. Inner walls 211 downwardly extend from the cutting lines of edge 209 and are in communication with an enlarged interior bore 213 having a generally cylindrical shape. Secondary formation 205 is similarly constructed.

Furthermore, compression springs 221 are secured within corresponding cylindrical passageways 223 in die body 201. A lower end of each compression spring is secured by a laterally elongated roll pin 225 and an upper end of compression spring 221 longitudinally biases an enlarged head of an ejection or stripping pin 227, an end of which operably projects through a corresponding hole in the top surface of die body 201. This upwardly pushes the workpiece away from the die after the nut is attached to the workpiece.

During pierce nut insertion, workpiece 35 is placed upon edge 209 of die 39 while the press is in an open position, and generally simultaneous with feeding and loading of the piece nut onto the plunger. Thereafter, the upper platten or press shoe 43 is lowered which causes plunger 91 to advance the leading pierce nut 33 on top of workpiece 35, aligned with longitudinal axis 199. The lower surface of pierce nut will act in conjunction with edge 209 of die 39 to first pierce and sever a generally rectangularly shaped blank 251, corresponding to the intersection of edge 209 and inner walls 211. Blank 251 exits die 39 through bore 213 and an attached tube. Next, the remaining interior edge 253 (see FIG. 12) of workpiece 35 is then upwardly bent by the side wall 207 so as to be clinched and secured into corresponding grooves in a lower surface of pierce nut 33. These bottom grooves in nut 33 may be undercut or the like. Thereafter, reopening of the press will cause the feet of the plunger to linearly pull out of the nut so the workpiece can be transferred out of the tool.

The piercing and clinching of the workpiece to the nut only occurs for the primary formation 203 of die 37 and not for the supplemental formation 205 in the preferred construction. Supplemental formation 205 is provided as a replacement piercing and clinching formation after wear has occurred to the primary formation. After which, the die is unscrewed from the corresponding platten or shoe 45 of the press, reversed, and then reattached thereto. This secondary formation provides for a very simple, inexpensive and convenient replacement in a single piece and integrated manner.

Figure 19:
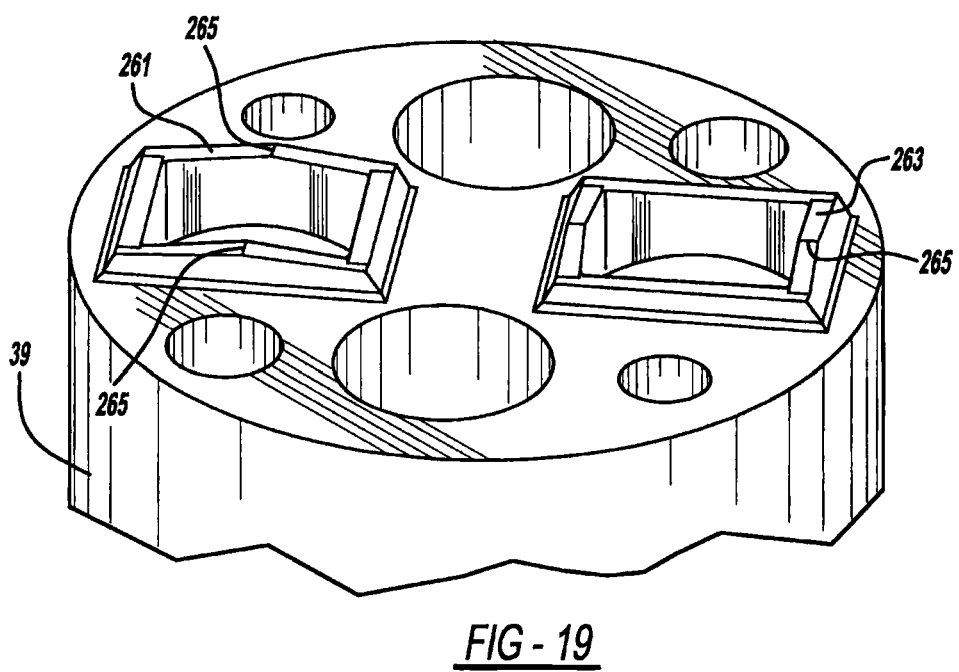
FIG. 19 is a fragmentary, perspective view showing a second embodiment of the die-side of the insertion tool.

FIG. 19 shows a second alternate embodiment piercing and clinching formations 261 for die 39. Two or more sections of a formation edge 263 are each provided with a centralized and localized peak 265. This increases point-loading against the lower surface of the workpiece during the piercing. It is envisioned that this will advantageously decrease the press forces required to pierce the pierce nut into the workpiece. The edge may also be beveled in cross-section with the highest elevation being closest to the internal walls defining the blank receiving hole. The primary and secondary formations show different configurations of the locally peaked feature. Finally, FIG. 20 shows yet another alternate embodiment of die 39 wherein only a single piercing and clinching formation 267 is employed.

Base 41 and body 57 are preferably machined from hard coated aluminum to minimize weight. Plunger 91 and punch 85 are preferably machined from 4140 hot rolled steel and 6150 hot rolled steel rods, respectively; the plunger is then hardened and ground to about Rc 40-44. Moreover, die body 201 is preferably machined from an M2 steel rod.

A preferred embodiment of the present pierce nut insertion tool 301 is shown in FIGS. 21-29. A base 303 is screwed to a mounting block 305 (see FIG. 21) which, in turn, is affixed to an upper platten 307 of a vertically moveable press. A shoe or body 309 is movably coupled to base 303 by way of a pneumatically driven piston including a piston head 311 and a piston rod 313. Piston head 311 is vertically movable within a piston chamber or cavity 315 located partially within base 303 and partially within an extension cylinder 317 provided within an end cap 319. Piston rod 313 further includes a vertically elongated and central channel or slot 321 which moves about a guide 323 affixed to base 303 to prevent rotation of the piston when linearly moving. A distal end of piston rod 313 is affixed to body 309 via screw 325.

A punch assembly 351, including a punch 353 and plunger 355, are generally the same as with the prior embodiment. It is alternately envisioned, however, that a solid and rigid plunger that only abuts against an upper surface of a pierce nut 357 without entering a hole in the nut, can be used although various advantages of the prior embodiment may not be realized. Punch assembly 351 serves to linearly drive each nut 357 from a leading feed position aligned with a punch axis to a piercing and clinching position against a workpiece 535. A conventional die with a single clinching formation can be used on an opposite side of the workpiece.

Figure 29:
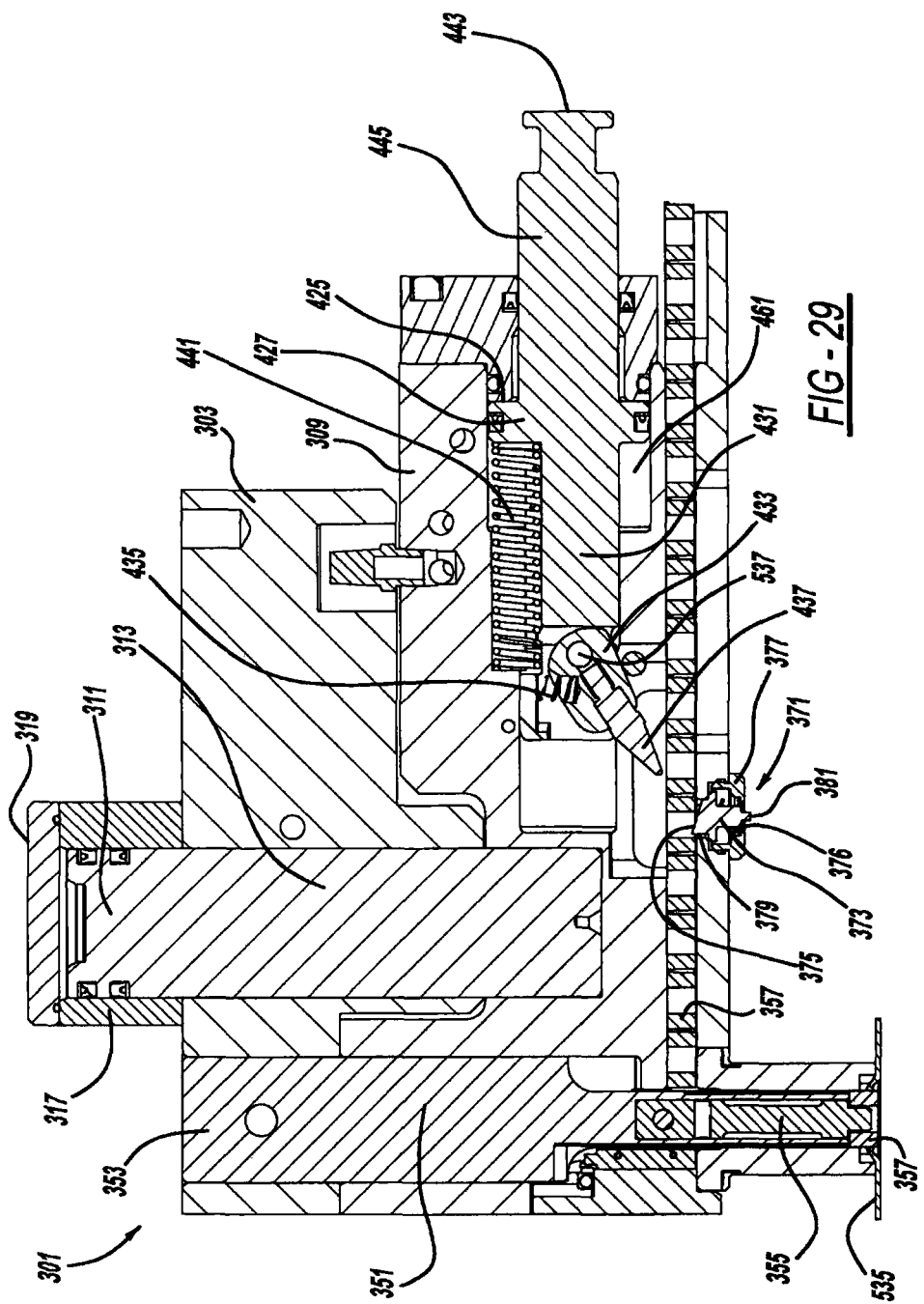
FIG. 29 is a sectional view, taken along line 29-29 of FIG. 28, showing the preferred embodiment insertion tool, in the closed position.

A detent mechanism 371 can best be observed in FIG. 29. Detent mechanism 371 includes a detent member 373 having a middle post upon which is located a laterally expanded ledge and an upper wedge surface 375 having a tapered angle offset from a nut feeding direction. A compression spring 376 or belleville washer serves to upwardly bias detent member 373 away from a screw-in or snap-in cap 377 retaining mechanism 371 to body 309. In operation, advanced feeding of the string of connected nuts 357 toward punch assembly 351 causes tilted deflection and linear retraction of detent member 373 toward cap 377. When the central hole of nut 357 overlies detent member 373, however, detent member 373 will fully advance such that a leading surface 379 thereof will abut against an inner edge defining the nut hole to deter undesired rearward and retracted movement of the nut string. This action serves to temporarily hold the nuts when a pawl ratchets back to a subsequent nut as will be further discussed hereinafter. A release finger 381 downwardly extends through an aperture in cap 377 to allow manual tilting and disengagement of detent member 373 if manual retraction of the nut string is desired.

Referring now to FIGS. 21-26 and 29, an internally valved and controlled, pneumatic fluid actuation system is shown for feeding the connected string of nuts 357. A hollow elbow fitting 401 is attached to the upper surface of body 309 in a threaded manner in alignment with an internal fluid passageway 403. A distal end of fitting 401 mates with an air supply hose. When the insertion tool is closed, as illustrated in FIGS. 21 and 29, air flowing through a first longitudinal and horizontal passageway 405 will abut against and be blocked by a nominal cylindrical outside surface 406 (see FIG. 22) of a vertically moveable shaft or spool 411. In this situation, an internally mounted valve 423 is in its normally closed and unactuated condition. Furthermore, a compression spring 441 therefore pushes a front end of a nut feeding piston head 427 to its retracted position. A compression spring 413 serves to downwardly bias spool 411, the upper section of which is hollow for receiving a portion of the spring.

Figure 23:
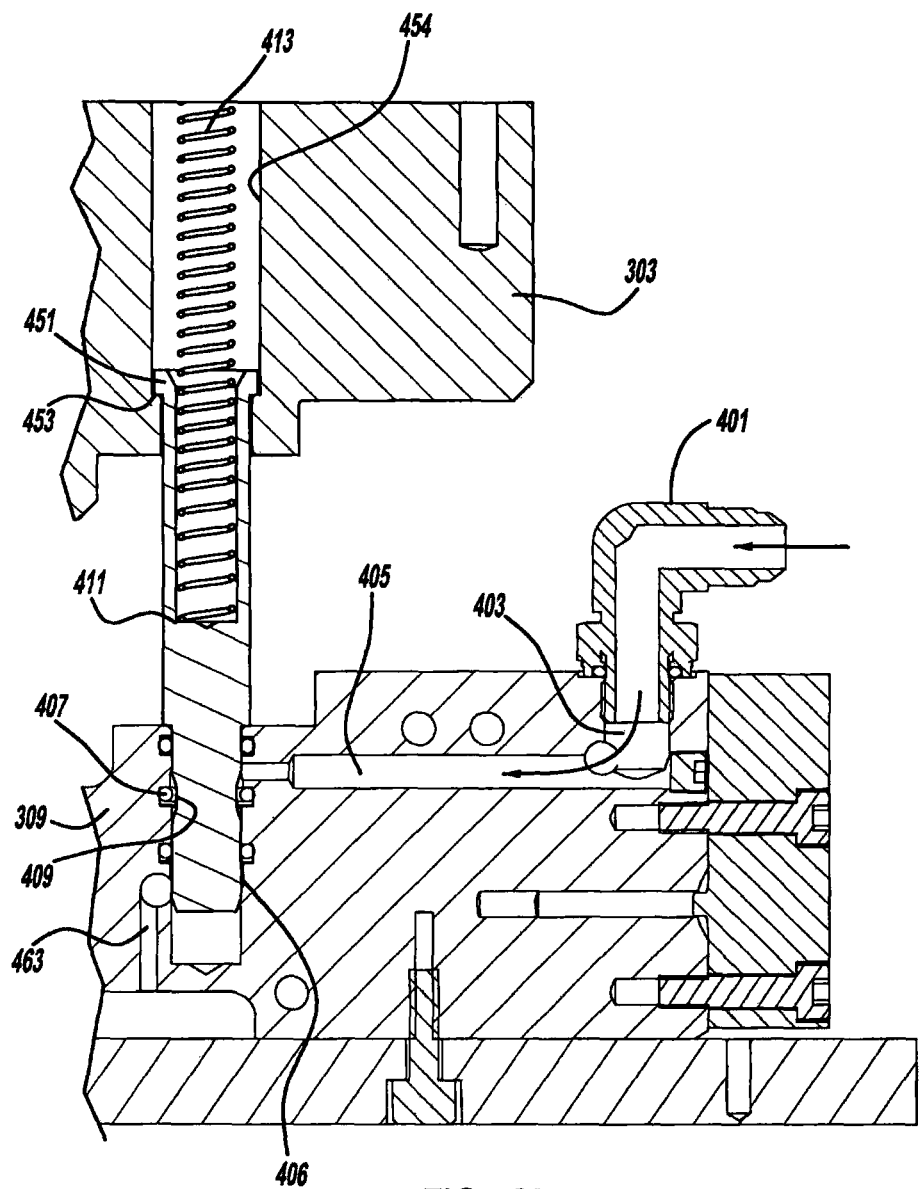
FIG. 23 is a fragmentary and sectional view, taken along line 23-23 of FIG. 22, showing the preferred embodiment insertion tool, in an intermediate position approximately 5.5 mm from the fully open position.
Figure 27:
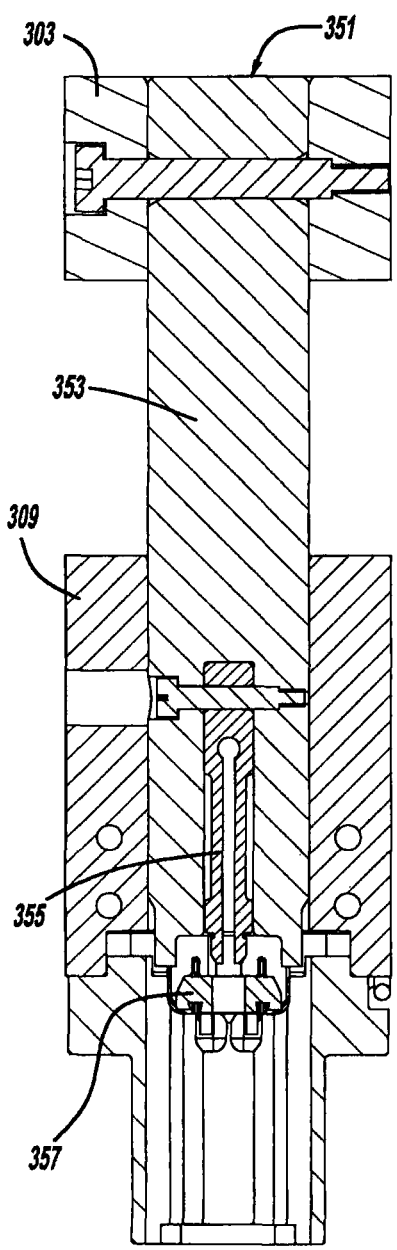
FIG. 27 is a cross-sectional view, taken along line 27-27 of FIG. 24, showing the preferred embodiment insertion tool, in the fully open position.
Figure 28:
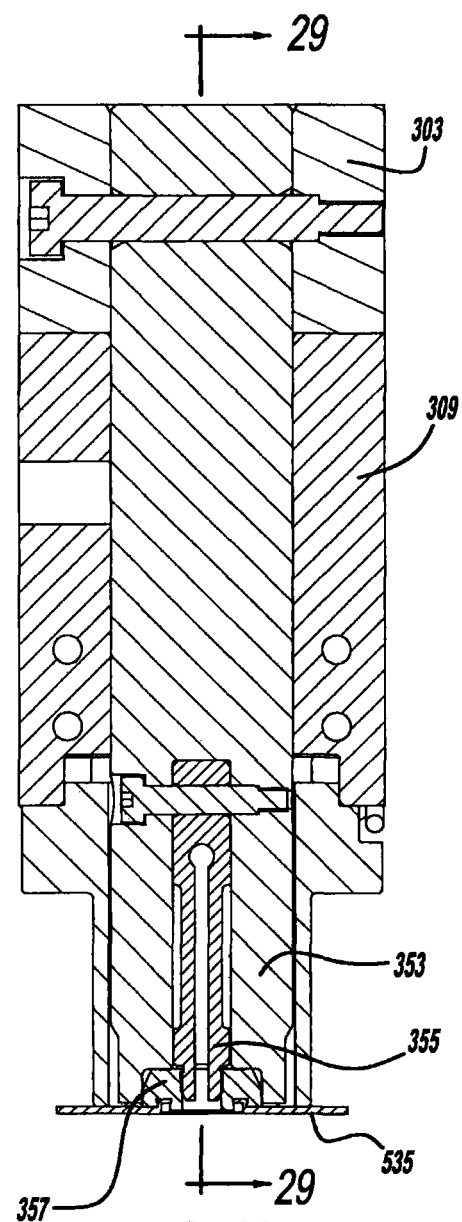
FIG. 28 is a cross-sectional view, taken along line 28-28 of FIG. 21, showing the preferred embodiment insertion tool, in the closed position.

FIGS. 23, 25 and 26 illustrate body 309 moved to an intermediate position approximately 5.5 mm above the fully open position by advancement of piston head 311 and rod 313. In this condition, an annular groove 409 of spool 411 provides open airflow access spanning around a central O-ring seal 407 in body 309. This allows air to flow from passageway 405 to lateral passageway 421, and then to a second lateral passageway 422. Accordingly, the air is transmitted to an internal control valve 423 mounted within and moving with body 309. Valve 423 is preferably a cartridge insert, three way, air-pilot valve which can be obtained from Humphrey Products, Co. of Kalamazoo, Mich. The air-pilot valve uses the initial air pressure passing through groove 409 of spool 411 to shift a gate of the valve to an open and actuated condition in a very fast manner with a relatively small amount of pilot air flow pressure. This allows the full inlet air pressure through fitting 401 to be directed onto a rear face 425 of nut feeding piston head 427 via internal body passageways 422 and 424 (see FIG. 24). Thus, approximately 80 psi of air pressure enters a piston cavity 461, overcomes spring 441 and moves piston head 427 from the retracted position, shown in FIGS. 21 and 29, to the advanced position shown in FIG. 24.

Opening of body 309 from the closed position of FIGS. 21 and 29, to the fully open position of FIG. 26, advances a nut feeder. The nut feeder includes a nut feeding piston rod 431 upon which is journaled a knuckle 433, via a pivot pin 537. A compression spring 435 serves to downwardly bias knuckle 433 such that a removable, tapered pawl 437 advances the corresponding nut within which it is engaged. This advancing motion of piston head 427 also compresses compression spring 441. The string of nuts 357 is connected by a pair of elongated wires and initially fed into an end of body 309 in a nut path or track located on an opposite side of the nut feeder and nut feeding piston from base 303 and platen 307. The nuts are fed in a linear direction generally parallel to an advancing direction of piston head 427 and feeder. Additionally, a manually accessible knob 443 is connected to piston head 427 by way of an intermediate structure 445 so as to allow manual overriding advancing and/or retraction of the nut feeding pawl 437 during initial loading or removal of the nuts.

In the FIGS. 22 and 24 fully open orientation, an upper ledge 451 of spool 411 abuts against a corresponding step 453 in a vertical counter-bore 454. This serves to pull up the spool. Valve 423 is actuated until body 309 begins to close, wherein the air is exhausted. However, valve 423 is not closed at the fully retracted and closed position. An exhaust outlet 463 and a muffler valve vent 465 are provided to allow the escape of air.

It is noteworthy that the internally valved construction of the present embodiment provides a considerably faster cycle time then with an externally valved approach. Furthermore, no controller programming is required for nut feeding with the preferred embodiment arrangement while this embodiment additionally simplifies installation set-up of the nut feeding mechanism in a fool-proof manner. Furthermore, proximity sensors are not required to sense piston location for nut feeding thereby saving additional expense, packaging space and maintenance concerns.

While various constructions of a pierce nut insertion tool have been disclosed, alternate embodiments may be employed. For example, hydraulic fluid actuators or electromagnetic actuators can be used for moving the body relative to the base and/or moving the feeder in some of the embodiments, however, various advantages of the present tool may not be achieved. Furthermore, the collet-like plunger may have three, four or a greater number of flexible legs, however, various advantages of the present tool may not be realized. Alternately, the die may include more than two of the piercing and clinching formations. Moreover, different, additional or varying locations of fasteners, sensors, fluid passageways and connectors may be utilized, but this may forfeit certain advantages of the present tool.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. It is intended by the following claims to cover these and any other departures from the disclosed embodiments which fall within the true spirit of this invention.

The invention claimed is:

1. A pierce nut insertion tool comprising:
  a base;
  a pierce nut-driving punch assembly attached to the base defining a longitudinal axis;
  a body including an opening through which an end of the pierce nut-driving punch assembly extends when the body is retracted to a pierce nut-fastening position where the body is adjacent the base;
  a first automatic actuator longitudinally driving the body between the fastening position and an advanced position where a majority of the body is spaced away from the base;
  a pierce nut-feeder coupled to and moveable with the body operably defining a pierce nut feeding direction that is transverse to the longitudinal axis; and
  a second automatic actuator operably driving the pierce nut-feeder in the pierce nut feeding direction that is transverse to the longitudinal axis as defined by the pierce nut-driving punch assembly, the second automatic actuator being at least one of: (a) moveable mechanically independent of the longitudinal movement of the body between the advanced and fastening body positions and longitudinal movement of the first automatic actuator, or (b) fluid actuated including a piston that moves transversely relative to the longitudinal axis of the pierce nut-driving punch assembly due to fluid pressure;

the second automatic actuator being adapted to causing the pierce nut-feeder to simultaneously move multiple connected pierce nuts per cycle.

2. The tool of claim 1, wherein the second automatic actuator comprises a piston and a structure extending from the piston, the pierce nut-feeder comprises a pierce nut-pushing pawl coupled to the structure, and a piston chamber is located within the body.

3. The tool of claim 1, wherein the first automatic actuator comprises a piston and a rod extending from the piston, an end of the rod being coupled to the body, and a piston chamber is at least partially located within the base, the piston operably moving within the piston chamber.

4. The tool of claim 1, wherein the pierce nut-feeder comprises:
   a knuckle rotatably coupled to the second automatic actuator;
   a biasing member urging a portion of the knuckle away from the second automatic actuator; and
   a pierce nut-pushing pawl removeably attached to the knuckle, the pawl including a substantially conical pierce nut-contacting end.

5. The tool of claim 1, wherein the pierce nut-driving punch assembly comprises:
   a punch fixed to the base; and
   a collet-like, pierce nut-retaining and driving plunger mounted to the punch.

6. The tool of claim 1, wherein the pierce nut-feeder receives multiple pierce nuts that are retained together in a linear string by at least one elongated member, the pierce nut-feeder pushes the multiple pierce nuts in the pierce nut feeding direction toward the longitudinal axis, an end of the pierce nut-driving punch assembly engages a central opening in an aligned one of the multiple pierce nuts, the first automatic actuator retracts the lower body to cause severing of the elongated member retaining the multiple pierce nuts, the first automatic actuator retracts the body to cause the severed and aligned pierce nut and the adjacent end of the pierce nut-driving punch assembly to extend beyond the body in the same retracting stroke of the first automatic actuator, and a press platten attached to the base moves the pierce nut-driving punch assembly and pierce nut to a pierce nut clinching location.

7. The tool of claim 1, further comprising:
   a pierce nut-retention sensor attached to the body adjacent an end of the pierce nut-driving punch assembly when the body is in the advanced position; and
   at least one position sensor located adjacent at least one of the first and second automatic actuators to detect a position of at least one of the first and second automatic actuators.

8. The tool of claim 1, further comprising an extension arm coupled to the second automatic actuator and externally projecting from the body, the extension arm allowing for manual linear movement of the second automatic actuator and the pierce nut-feeder in the pierce nut feeding direction that is transverse to the longitudinal axis when the second automatic actuator is deenergized.

9. The tool of claim 1, wherein the second automatic actuator includes the fluid actuated piston, further comprising a pneumatically actuated valve disposed within the body, the pneumatically actuated valve controlling pneumatic fluid flow to the piston, and the second automatic actuator being free of a piston-location sensor.

10. The tool of claim 1, further comprising a valve being opened and closed internally within the body, the valve including:
    a spool having an elongated shaft separate from the first automatic actuator and the second automatic actuator and a first end coupled in the base and a second end of the shaft moving within a bore of the body;
    a seal sealing the elongated shaft of the spool within the body; and
    the elongated shaft of the spool operably controlling fluid flow within the body to assist in causing actuation of the second automatic actuator which includes the piston.

11. The tool of claim 1, wherein multiple pierce nuts are received by the pierce nut-feeder along the pierce nut feeding direction with each one of the multiple pierce nuts having an internally threaded hole and a substantially polygonal periphery, the pierce nut feeding direction being substantially parallel to the advancing direction of the pierce nut-feeder, and the second automatic actuator includes the piston.

12. A pierce nut insertion tool comprising:
    a base;
    a plunger attached to the base;
    a body including an opening through which an end of the plunger extends when the body is closed to a fastening position adjacent the base;
    a first fluid powered actuator longitudinally moving the body between a closed position and an open position;
    a second fluid powered actuator including a piston head that is internally moveable within the body in an advancing direction transverse to the plunger;
    a linear string of multiple pierce nuts linearly moveable into an end of the body substantially parallel to the advancing direction of the second fluid powered actuator;
    a feeder moveable substantially within the body in the advancing direction of the second fluid powered actuator that is driven by the second fluid powered actuator and includes a surface which contacts against a surface of one pierce nut of the linear string of multiple pierce nuts during feeding;
    fluid flow pathways located inside the body; and
    a valve moveable within the body, the valve controlling fluid flow from at least one of the pathways to the piston head.

13. The tool of claim 12 wherein:
    the second fluid powered actuator comprises a rod extending from the piston head;
    the feeder comprises a spring biased knuckle and a pawl including the surface which contacts one pierce nut of the linear string of multiple pierce nuts, the knuckle being coupled to the rod, and the pawl being removable from the knuckle for service;
    the pawl entering a hole in one pierce nut of the linear string of multiple pierce nuts to push the linear string of multiple pierce nuts in the advancing direction of the second fluid powered actuator and toward the plunger;
    the pawl ratcheting over one pierce nut of the linear string of multiple pierce nuts when retracting to engage a subsequent pierce nut to be fed;
    a detent member engaging with each of the pierce nuts of the linear string of multiple pierce nuts on a side opposite the pawl; and
    a biasing member located below a section of the detent member to allow the pierce nuts of the linear string of multiple pierce nuts to be fed past the detent member.

14. The tool of claim 12, wherein the valve further comprises:

a spool including an elongated shaft separate from the first fluid powered actuator and the second fluid powered actuator that moves within a bore disposed within the body to control fluid flow within the body and assist in causing actuation of the piston head;

a passageway disposed within the body adjacent the spool that communicates fluid between the bore containing the spool and at least the second fluid powered actuator;

an elongated shaft spring extending between the elongated shaft of the spool and the body to bias the spool in the base; and a set of seals sealing the elongated shaft of the spool within the body.

15. The tool of claim 12, further comprising a spring extending between the piston head of the second fluid powered actuator and the body that biases the piston head toward a retracted position away from the plunger, the linear string of multiple pierce nuts entering the body on a side of the piston head and the feeder that is opposite the base, the linear string of multiple pierce nuts being coupled together by an elongated connector during feeding, and the fluid being pneumatic.

16. A pierce nut insertion tool comprising:
a base;
a pierce nut-driving punch assembly attached to the base defining a longitudinal axis;
a body including an opening through which an end of the pierce nut-driving punch assembly extends when the body is retracted to a pierce nut-fastening position where the body is adjacent the base;
a first automatic actuator longitudinally driving the body between the fastening position and an advanced position where a majority of the body is spaced away from the base;
a pierce nut-feeder coupled to and moveable with the body operably defining a pierce nut feeding direction that is transverse to the longitudinal axis; and
a second automatic actuator operably driving the pierce nut-feeder in the pierce nut feeding direction that is transverse to the longitudinal axis as defined by the pierce nut-driving punch assembly, the second automatic actuator being at least one of: (a) moveable mechanically independent of the longitudinal movement of the body between the advanced and fastening body positions and longitudinal movement of the first automatic actuator, or (b) fluid actuated including a piston that moves transversely relative to the longitudinal axis of the pierce nut-driving punch assembly due to fluid pressure.

17. The tool of claim 16, wherein the pierce nut-feeder comprises:
a knuckle rotatably coupled to the second automatic actuator;
a biasing member urging a portion of the knuckle away from the second automatic actuator; and
a pierce nut-pushing pawl removeably attached to the knuckle, the pawl including a substantially conical pierce nut-contacting end.

18. The tool of claim 16, wherein the pierce nut-feeder receives multiple pierce nuts that are retained together in a linear string by at least one elongated member, the pierce nut-feeder pushes the multiple pierce nuts in the pierce nut feeding direction toward the longitudinal axis, an end of the pierce nut-driving punch assembly engages a central opening in an aligned one of the multiple pierce nuts, the first automatic actuator retracts the lower body to cause severing of the elongated member retaining the multiple pierce nuts, the first automatic actuator retracts the body to cause the severed and aligned pierce nut and the adjacent end of the pierce nut-driving punch assembly to extend beyond the body in the same retracting stroke of the first automatic actuator, and a press platten attached to the base moves the pierce nut-driving punch assembly and pierce nut to a pierce nut clinching location.

19. The tool of claim 16, further comprising:
a pierce nut-retention sensor attached to the body adjacent an end of the pierce nut-driving punch assembly when the body is in the advanced position; and
at least one position sensor located adjacent at least one of the first and second automatic actuators to detect a position of at least one of the first and second automatic actuators.

20. The tool of claim 16, further comprising an extension arm coupled to the second automatic actuator and externally projecting from the body, the extension arm allowing for manual linear movement of the second automatic actuator and the pierce nut-feeder in the pierce nut feeding direction that is transverse to the longitudinal axis when the second automatic actuator is deenergized.

21. The tool of claim 16, wherein the second automatic actuator includes the fluid actuated piston, further comprising a pneumatically actuated valve disposed within the body, the pneumatically actuated valve controlling pneumatic fluid flow to the piston, and the second automatic actuator being free of a piston-location sensor.

22. The tool of claim 16, further comprising a valve being opened and closed internally within the body, the valve including:
a spool having an elongated shaft separate from the first automatic actuator and the second automatic actuator and a first end coupled in the base and a second end moving within a bore of the body;
a seal sealing the elongated shaft of the spool within the body; and
the elongated shaft of the spool operably controlling fluid flow within the body to assist in causing actuation of the second automatic actuator which includes the piston.

23. A pierce nut insertion tool comprising:
a base;
a plunger attached to the base;
a body including an opening through which an end of the plunger extends when the body is closed to a fastening position adjacent the base;
a first fluid powered actuator longitudinally moving the body between a closed position and an open position;
a second fluid powered actuator including a piston head that is internally moveable within the body in an advancing direction transverse to the plunger;
a feeder moveable substantially within the body in the advancing direction of the second fluid powered actuator that is driven by the second fluid powered actuator;
fluid flow pathways located inside the body; and
a valve moveable within the body, the valve controlling fluid flow from at least one of the pathways to the piston head.

24. The tool of claim 23 wherein:
the second fluid powered actuator comprises a rod extending from the piston head;
the feeder comprises a spring biased knuckle and a pawl including the surface which contacts one pierce nut in a linear string of multiple pierce nuts received by the feeder, the knuckle being coupled to the rod, and the pawl being removable from the knuckle for service;

the pawl entering a hole in one pierce nut of the linear string of multiple pierce nuts to push the linear string of multiple pierce nuts in the advancing direction of the second fluid powered actuator and toward the plunger;

the pawl ratcheting over one pierce nut of the linear string of multiple pierce nuts when retracting to engage a subsequent pierce nut to be fed;

a detent member engages each of the pierce nuts of the linear string of multiple pierce nuts on a side opposite the pawl; and a biasing member located below a section of the detent member allows the pierce nuts of the linear string of multiple pierce nuts to be fed past the detent member.

25. The tool of claim 23, wherein the valve further comprises:

a spool including an elongated shaft separate from the first fluid powered actuator and the second fluid powered actuator that moves within a bore disposed within the body to control fluid flow within the body and assist in causing actuation of the piston head;

a passageway disposed within the body adjacent the spool that communicates fluid between the bore containing the spool and at least the second fluid powered actuator;

an elongated shaft spring extending between the elongated shaft of the spool and the body to bias the spool in the base; and a set of seals sealing the elongated shaft of the spool within the body.

26. The tool of claim 23, further comprising a spring extending between the piston head of the second fluid powered actuator and the body that biases the piston head toward a retracted position away from the plunger, the linear string of multiple pierce nuts entering the body on a side of the piston head and the feeder that is opposite the base, the linear string of multiple pierce nuts being coupled together by an elongated connector during feeding, and the fluid being pneumatic.

* * * * *

UNITED STATES PATENT AND TRADEMARK OFFICE
CERTIFICATE OF CORRECTION

| | |
|---|---|
| PATENT NO. | : 8,881,364 B2 |
| APPLICATION NO. | : 13/308583 |
| DATED | : November 11, 2014 |
| INVENTOR(S) | : Sawdon et al. |

It is certified that error appears in the above-identified patent and that said Letters Patent is hereby corrected as shown below:

In the Specification:

Column 6, line 2;
 delete "37" and insert --39--.

Signed and Sealed this
Twenty-sixth Day of May, 2015

Michelle K. Lee
*Director of the United States Patent and Trademark Office*